United States Patent [19]

Rothrock et al.

[11] Patent Number: 5,729,687
[45] Date of Patent: Mar. 17, 1998

[54] SYSTEM FOR SENDING DIFFERENCES BETWEEN JOINING MEETING INFORMATION AND PUBLIC MEETING INFORMATION BETWEEN PARTICIPANTS IN COMPUTER CONFERENCE UPON COMPARING ANNOTATIONS OF JOINING AND PUBLIC MEETING INFORMATION

[75] Inventors: Lewis V. Rothrock, Beaverton; Tyler R. Thessin, Portland, both of Oreg.

[73] Assignee: Intel Corporation, Santa Clara, Calif.

[21] Appl. No.: 170,398

[22] Filed: Dec. 20, 1993

[51] Int. Cl.$^6$ .......................... G06F 15/16; G06F 15/40; G06F 13/10

[52] U.S. Cl. .............. 395/200.34; 395/200.35; 395/885; 395/892

[58] Field of Search .................. 395/200, 800, 395/885, 200.04, 500, 892, 200.34, 200.35; 379/202

[56] References Cited

U.S. PATENT DOCUMENTS

| | | | |
|---|---|---|---|
| 4,022,981 | 5/1977 | McLaughlin et al. | 179/18 BC |
| 4,654,483 | 3/1987 | Imai et al. | 379/54 |
| 4,691,347 | 9/1987 | Stanley et al. | 379/203 |
| 4,953,159 | 8/1990 | Hayden et al. | 370/265 |
| 5,239,466 | 8/1993 | Morgan et al. | 395/148 |
| 5,363,507 | 11/1994 | Nakayama et al. | 395/800 |
| 5,392,400 | 2/1995 | Berkowitz et al. | 395/200 |
| 5,408,470 | 4/1995 | Rothrock et al. | 370/62 |

FOREIGN PATENT DOCUMENTS

| | | | |
|---|---|---|---|
| 0 279 558 | 8/1988 | European Pat. Off. | G09B 5/14 |
| 8906078 | 12/1988 | European Pat. Off. | |
| 0561649 | 3/1993 | European Pat. Off. | |

*Primary Examiner*—Moustafa M. Meky
*Assistant Examiner*—Rehana Perveen
*Attorney, Agent, or Firm*—Blakely, Sokoloff, Taylor & Zafman

[57] ABSTRACT

The present invention is an apparatus and method for joining participants in a conferencing system. In a computer conferencing system having a plurality of participants coupled by a communication medium, each participant of the plurality of participants having a meeting manager, a process and apparatus is disclosed for joining participants in the conferencing system. This process comprises the steps of: 1) collecting public meeting information generated by any of the plurality of participants, the public meeting information includes zero or more pages of annotations; 2) receiving a connection indication from a joining participant; 3) receiving joining meeting information from the joining participant; 4) comparing the public meeting information with the joining meeting information and generating a set of differences; and 5) selectively sending the set of differences to the joining participant or the plurality of participants or both the joining participant and the plurality of participants. The process of the present invention further includes the step of collecting private meeting information from a local participant in which the meeting manager is resident. The private meeting information is different from the public meeting information and the private meeting information is not accessible to participants of the plurality of conference participants other than the local participant.

In the present invention, one and only one participant of the plurality of participants is assigned an arbitrator status, the arbitrator status being dynamically modifiable. The one participant is denoted as the arbitrator participant.

22 Claims, 24 Drawing Sheets

SYSTEM FOR SENDING DIFFERENCES BETWEEN JOINING MEETING INFORMATION AND PUBLIC MEETING INFORMATION BETWEEN PARTICIPANTS IN COMPUTER CONFERENCE UPON COMPARING ANNOTATIONS OF JOINING AND PUBLIC MEETING INFORMATION

BACKGROUND OF THE INVENTION

1. Field of the Invention

The present invention relates to the field of networked computer systems. Specifically, the present invention relates to the field of sharing information in a computer conferencing system.

2. Description of Related Art

A set of personal computers interconnected on a network can be effectively used as a conferencing system. In such a system, each conference participant comprises a personal computer user having a computer, a display screen, a computer network interface, and typically a mouse or cursor control device. Conference participants are linked together by a computer network. This network may comprise either a hard wired Local Area Network (LAN) such as Ethernet, a telephone modem link, or other conventional data communications network. Because the conference participants are linked via a computer network, the participants do not need to be located in the same physical space. Rather, an effective conference may be carried out as participants view common information on their local display screens and manipulate the information using their local cursor control devices or other input devices.

Several problems are present in these prior art conferencing systems. In a typical conferencing application, a group of conference participants linked via a network share common information pertaining to a particular meeting or topic under discussion. By sharing information between conference participants, each participant is able to view and manipulate the information disbursed during the meeting. Immediately after a meeting is initiated, a pool of information collected during the meeting begins to accumulate. As each conference participant makes modifications or additions to this pool of meeting information, the individual contributions must be circulated around to the other conference participants so that each participant has a complete and up to date copy of the meeting information. It will be appreciated that maintaining synchronization and currency of the meeting information among all conference participants is a difficult task and may involve the transfer of large amounts of information. This task is complicated by the fact that during the course of the meeting, individual conference participants may disconnect from the conference or other new conference participants may join the meeting after the collection of meeting information has already begun. In other situations, a particular conference participant may disconnect from the conference only to rejoin at some later time. In these and other situations, it becomes necessary to bring a joining or rejoining conference participant into synchronization with the other conference participants. This synchronization involves providing the joining participant a current copy of the cumulative meeting information.

Because of the complexity of this problem, prior art conferencing systems have solved the problem in two basic unsatisfactory ways. In a first prior art solution, all conference participants are required to join at the beginning of a meeting. In this manner, all conference participants are in synchronization from the start of the meeting and no joining participant synchronization problem is encountered. This prior art restriction clearly limits the effectiveness of a typical conferencing solution.

In a second prior art solution to the joining participant synchronization problem, some prior art systems bring a joining or rejoining participant into synchronization with other conference participants by sending the joining participant the entire content of the pool of meeting information collected up to that point. Although this solution solves the joining participant synchronization problem, the solution produces a tremendous processing and data transmission load over the conferencing network. Because a typical collection of meeting information may comprise many megabytes of information, the transfer of an entire set of meeting information to a joining or rejoining participant may severely degrade conference performance.

In a third prior art solution to the joining conference participant synchronization problem, some prior art systems simply do not provide the joining participant with any of the meeting information collected from the start of the meeting up to the time the new participant joins the conference. Again, in this prior art solution, the joining participant synchronization problem is avoided. However, the joining participant is unable to view the information collected prior to joining. Therefore, the utility of the conference for the joining participant is severely hampered. In basic terms, the prior art has been unable to provide an effective and cost efficient capability for merging a joining or rejoining conference participant into an ongoing meeting.

Thus, a better method and apparatus for joining participants in a conferencing system is needed.

SUMMARY OF THE INVENTION

The present invention is an apparatus and method for joining participants in a conferencing system. In a computer conferencing system having a plurality of participants coupled by a communication medium, each participant of the plurality of participants having a meeting manager, a process and apparatus is disclosed for joining participants in the conferencing system. This process comprises the steps of: 1) collecting public meeting information generated by any of the plurality of participants, the public meeting information includes zero or more pages of annotations; 2) receiving a connection indication from a joining participant; 3) receiving joining meeting information from the joining participant; 4) comparing the public meeting information with the joining meeting information and generating a set of differences; and 5) selectively sending the set of differences to the joining participant or the plurality of participants or both the joining participant and the plurality of participants. The process of the present invention further includes the step of collecting private meeting information from a local participant in which the meeting manager is resident. The private meeting information is different from the public meeting information and the private meeting information is not accessible to participants of the plurality of conference participants other than the local participant. In the present invention, one and only one participant of the plurality of participants is assigned an arbitrator status, the arbitrator status being dynamically modifiable. The one participant is denoted as the arbitrator participant.

It is therefore an advantage of the present invention to provide a means and method for merging joining participants into an ongoing meeting. It is a further advantage of the present invention that the merging process eliminates the unnecessary transfer of information across the conferencing network. It is a further advantage of the present invention that the meeting information collected for two conference participants can be compared and merged into a single composite collection of meeting information. It is a further advantage of the present invention to assign one conference participant as the arbitrator for a meeting. It is a further advantage of the present invention that the meeting structure is distinct from the meeting data, thus, the merge process is quicker and unnecessary transfer of data is avoided.

These and other advantages of the present invention are fully described in the following detailed description of the preferred embodiment.

DETAILED DESCRIPTION OF THE PREFERRED EMBODIMENT

The present invention is an apparatus and method for joining participants in a conferencing system. In the following detailed description, numerous specific details are set forth in order to provide a thorough understanding of the present invention. However, it will be apparent to one of ordinary skill in the an that these specific details need not be used to practice the present invention. In other instances, well-known structures, interfaces, and processes have not been shown in detail in order not to obscure unnecessarily the present invention.

Figure 1:
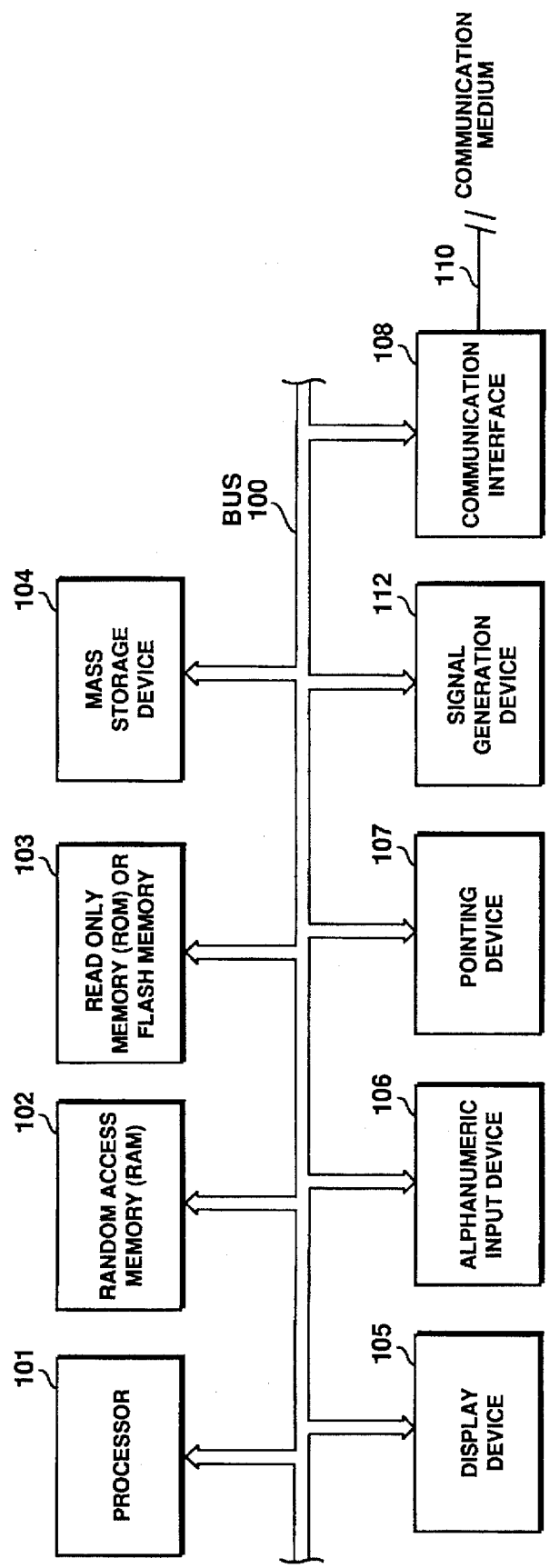
FIG. 1 is a block diagram illustrating the computer system hardware used in the preferred embodiment of the present invention.

Referring now to FIG. 1, a block diagram of the computer system hardware used in the preferred embodiment is illustrated. The computer system used in the preferred embodiment comprises a bus 100 for communicating information between computer system components. These components coupled to bus 100 include processor 101. In the preferred embodiment, processor 101 is an i486 brand microprocessor manufactured by Intel Corporation, Santa Clara, Calif. The i486 mark is a trademark of Intel Corporation. It will be apparent to those of ordinary skill in the art that other equivalent processors may be used with the present invention. Other system components include Random Access Memory (RAM) 102, Read Only Memory (ROM) 103, and mass storage device or disk drive 104. The computer system of the preferred embodiment also includes display device 105 coupled to the bus 100 for displaying information to a computer user, an alphanumeric input device 106 coupled to the bus 100 for communicating information and command selections to the processor 101, a pointing device or cursor control device 107 coupled to the bus 100 for communicating information and command selections to processor 101, and a signal generation device 112 coupled to the bus 100 for communicating command selections to the processor 101. Display device 105 may be a liquid crystal device, a cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the display screen of display device 105. Many implementations of the cursor control device 107 are well known in the art including trackball systems, mouse systems, joysticks, or special keys on the alphanumeric input device 106 capable of signaling movement in a given direction. Signal generation device 112 is typically implemented as a button or switch located on or near the cursor control device 107. The physical proximity of cursor control device 107 and signal generation device 112 allows a user to manipulate both devices simultaneously with one hand. The signal generation device may be operated between two control states: an active control state typically initiated by depression of a mouse button, and an inactive control state typically initiated by releasing the mouse button.

The computer system used in the preferred embodiment also includes a communication interface 108. Communication interface 108 is coupled to communication medium 110. Communication interface 108 provides a means for the computer system to communicate with a network of other computer systems. A variety of networks or communication media are well-known in the art. These communication media 110 include well-known Local Area Networks (LAN) such as Ethernet, Wide Area Networks (WAN), telephone modem links, wireless or cellular, or other well-known and conventional computer networking technology. The configuration and interconnection of computer system components as illustrated in FIG. 1 is well known to those of ordinary skill in the art.

Figure 2:
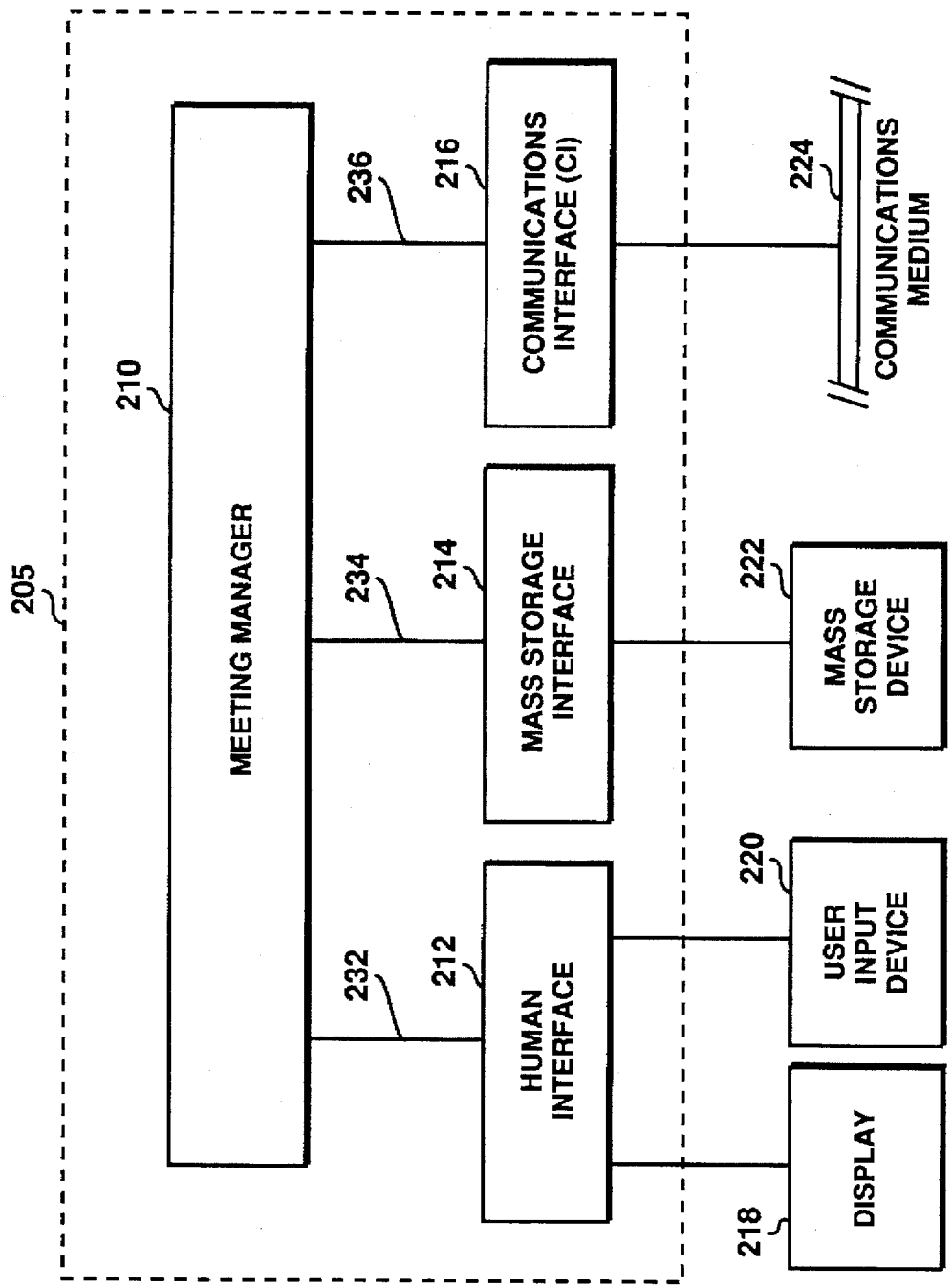
FIG. 2 illustrates a block diagram illustrating the basic architecture of the software of the present invention.

Referring now to FIG. 2, a block diagram of the software architecture 205 of the present invention is illustrated. The present invention comprises software operably disposed within random access memory (RAM) 102 and executed by processor 101. The software 205 of the present invention comprises a meeting manager component 210, a human interface component 212, a Communications Interface (CI) component 216, and an optional mass storage interface component 214. The meeting manager 210 comprises data structures and processing logic for implementing the features of the present invention. These data structures and the processing logic of meeting manager 210 are the subject of FIGS. 4–25 as presented in detail in the remaining portions of the detailed description of the preferred embodiment provided herein. Human interface component 212 comprises processing logic for displaying information on display device 218 and for processing user input provided through user input device 220. User input device 220 includes alphanumeric input device 106, pointing device or cursor control device 107, a signal generation device or mouse button 112, and other conventional devices for providing user input to a computer system. The human interface 210 in the preferred embodiment of the present invention performs mainly a function of displaying status information to a user on display device 218. Conventional methods exist for providing this display function. In other situations, human interface 212 provides command selections and other information to meeting manager 210 via interface 232. The information so provided will be described below in connection with the detailed description of meeting manager 210.

The preferred embodiment provides a capability for storing meeting information on a mass storage device or hard disk 222. Similarly, previously stored meeting information may be retrieved from mass storage device 222 through mass storage interface 214 and provided to meeting manager 210. The permanent storage of meeting information is advantageous in the present invention; because, conference participants may disconnect from a meeting and retain the meeting information generated up to that point on mass storage device 222. At a subsequent time, the conference participant may rejoin the meeting and recover the information previously stored on mass storage device 222. This capability allows a more efficient synchronization with other conference participants using the techniques of the present invention. The low level details of mass storage interface 214 and mass storage device 222, however, are well known to those of ordinary skill in the art.

Communications Interface (CI) 216 provides an interface with communications medium 224. The techniques of the present invention are generally applicable to any computer network or data communication medium including local area networks (LAN), wide area networks (WAN), telephone modems communication links, wireless communications links, or any other form of communications medium. Any data communications medium providing a capability for conferencing two or more conference participants can benefit by the techniques taught by the present invention. Thus, the communications interface component 216 comprises processing logic and data specific to the communications medium 224 being used for a particular conferencing application. These low level communications interface details for a particular network are well known to those of ordinary skill in the art. In addition, techniques for message passing across a network are well known in the art. In general, communications interface 216 provides an indication to meeting manager 210 across interface 236 when a new conference participant connects to communications medium 224 or when a message transferred across communications medium 224 arrives for processing by meeting manager 210. In either of these two cases, communications interface 216 provides notification and messages to meeting manager 210 across interface 236. The information provided to meeting manager 210 by communications interface 216 is discussed in detail in connection with FIGS. 4–25 as described below.

Figure 3:
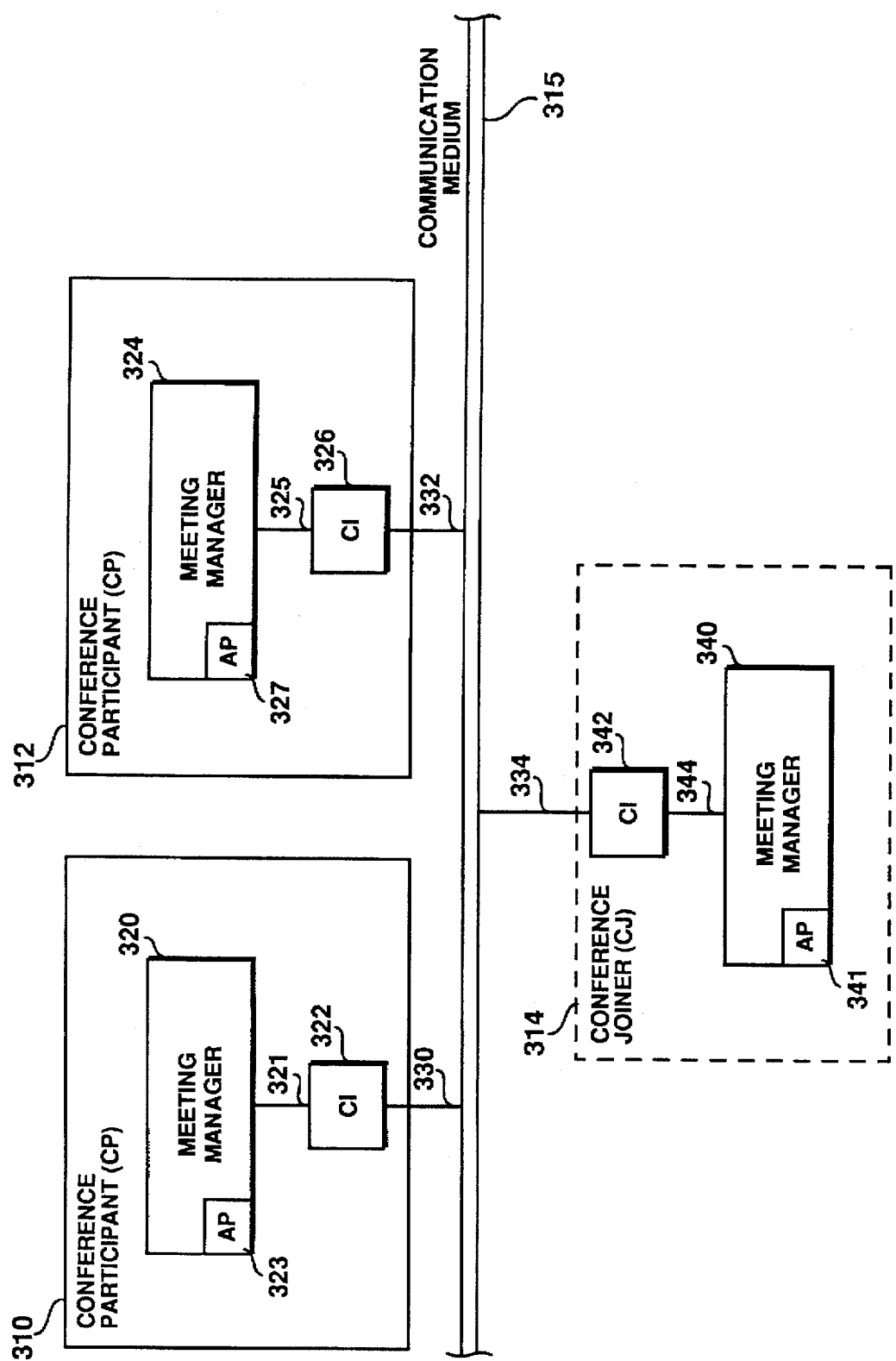
FIG. 3 illustrates a typical conferencing network comprising two existing conference participants and a joining conference participant.

Referring now to FIG. 3, a typical example of a data conferencing configuration using the present invention is illustrated. This sample data conferencing configuration comprises two conference participants 310 and 312 and a joining conference participant 314 coupled via communications medium 315. It will be apparent to one of ordinary skill in the art that any number of conference participants may be joined via a communications medium in the manner as illustrated in FIG. 3. In the example of FIG. 3, each of the conference participants 310, 312, and 314 execute the meeting manager processing logic of the present invention. Similarly, each of the conference participants include a communications interface coupled between communications medium 315 and meeting manager processing logic (i.e. 320, 324, and 340, respectively). The meeting manager software and the communications interface software in each of the conference participants is substantially the same logic. Thus, each conference participant includes the same conferencing capabilities as any other conferencing participant. The one exception to this rule is the assignment of an arbitrator participant.

The arbitrator participant state is the initial state of a Meeting Manager (320 for example) before any connections have been made. In order to join a conference, the conference joiner must by means of the Human Interface 212 initiate the connection process to another conference participant, for example 312 or 314. Subsequent to this user event, the Human Interface 212, sends a message to the Meeting Manager 320 to reset the arbitrator state by setting variable 323 with the identity of conference participant 312. The connection process proceeds through the Communications Interface 322. The result of this connection process is an initial connect event (see FIG. 9, step 912) received by both conference participants. However, because one participant inflated the connection and the other participant received the connection, the first participant is the conference joiner, and the second participant is the arbitrator. Once two participants are joined in a conference, conference participants (310 and 312 for example) are prevented from initating a connection process with a potential conference joiner 314, for example, by means of disabling this option in the Human Interface 212. The conference joiner always initiates the connection process. Through this process, only one conference participant can have the arbitrator participant status as all the participants join the conference.

If two joiners were to attempt to begin a conference by initiating the connection process to one another at the same time, both joiners would reset the arbitrator status as described above. However, one or both connection processes would fail. On this error event, the Communicatations Interface 216 causes a message to be sent to the Meeting Manager 210 to set the arbitrator status again. As a result of this message, the Meeting Manager 210 checks to see if a connection event as described in connection with FIG. 9 had occured while not in the arbitrator participant state. If so, this would indicate the case where one joiner's connection process to the current participant succeeded, while the current participant's connection process to the first failed. In this case, the participant queue is not empty. For each message found in the participant queue, the arbitrator participant repeats steps 926, 928, and 930 shown in FIG. 9.

Because the current participant is now the arbitrator again, any messages in the arbitrator message queue are not needed and are destroyed.

The arbitrator status may be changed to a different participant at any time during a meeting. The arbitrator status may be transferred from one conference participant to another; however, only one conference participant in the conference may carry the arbitrator status at any one time. The arbitrator status is maintained by setting a state variable within the meeting manager of each conference participant. The state variable contains the identity of the assigned arbitrator participant. For example, referring to FIG. 3, conference participant 310 may be assigned as the arbitrator by setting variable 323 with the identity of conference participant 310. Similarly, the variable 327 in conference participant 312 is also set to the identity of conference participant 310. Once joining participant 314 is notified of the identity of the arbitrator participant after the joining process has been completed, the variable 341 in meeting manager 340 will contain the identity of arbitrator participant 310. In this manner, the one and only one arbitrator participant is defined for all conference participant in the conference.

FIG. 3 illustrates a typical data conferencing configuration comprising a plurality of conference participants. In a typical conference scenario, two or more conference participants will initiate a conference or meeting by connecting to each other across communications medium 315. In the example of FIG. 3, conference participants 310 and 312 initially create a meeting (i.e. a connection) with each other across communications medium 315. As the meeting progresses, information is shared between participant 310 and participant 312 as controlled by meeting manager 320 and meeting manager 324 of each respective conference participant. The arbitrator participant, conference participant 310 in this example, is responsible for maintaining and dispersing the current and cumulative meeting information. As conference participants join the conference subsequent to the initiation of a meeting, such as conference joiner 314, arbitrator participant 310 is responsible for communicating with meeting manger 340 of joining participant 314 to merge the joining participant 314 into the conference. The techniques for performing this merge and join operation are described in the subsequent figures and detailed description of the present invention.

Figure 4:
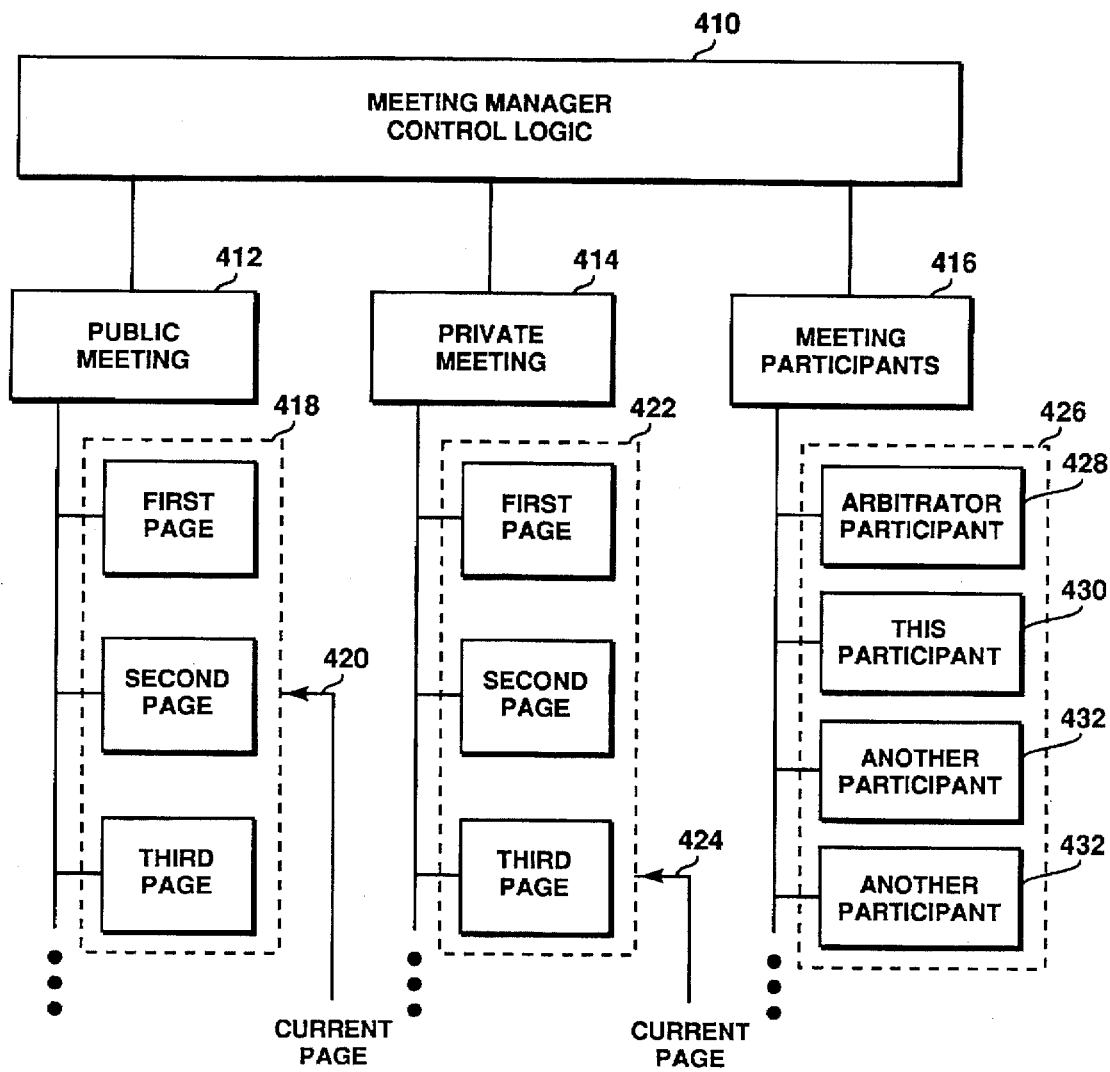
FIG. 4 illustrates several information components manipulated by the present invention.

Referring now to FIG. 4, three basic objects manipulated by meeting manager control logic 410 are illustrated. These basic components include public meeting information 412, private meeting information 414, and meeting participant information 416. The basic paradigm used in the present invention is a set of conference participants all sharing meeting information. This meeting information comprises multiple pages of drawing annotations, graphic annotations, or text annotations.

Figure 5:
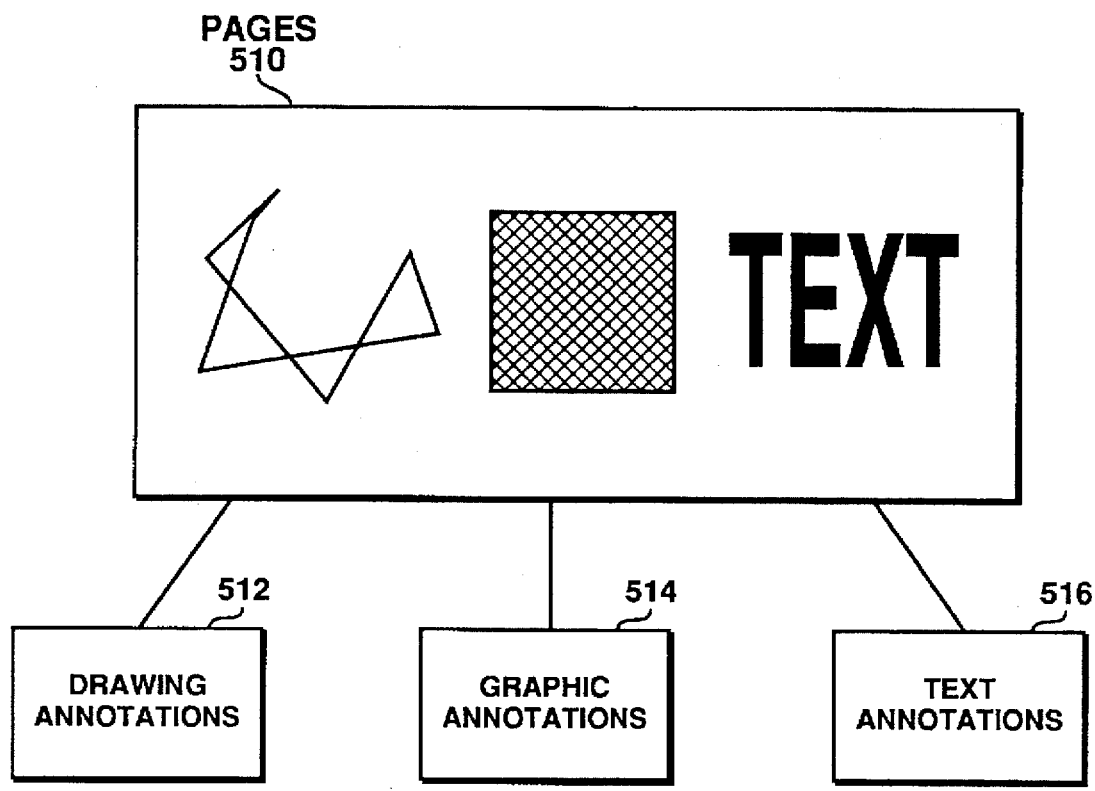
FIG. 5 illustrates the components of pages as manipulated in the present invention.

Referring to FIG. 5, the content of a page of meeting information in the present invention is illustrated. As shown, pages 510 include drawing annotations 512, which include graphic objects comprised of a plurality of graphic primitives such as line segments, arcs, polygons, or other drawing annotations created using typical drawing tools. Pages 510 also include graphic annotations 514 which typically comprise bit map graphics defined in terms of individual pixels or groups of pixels. Graphic annotations 514 may also include video data provided as part of a meeting page. Pages 510 also comprise text annotations 516 which comprise strings of text and control characters. Each page has an annotation list associated with the page. The annotation list represents the set of annotations that belong to a page.

Referring again to FIG. 4, meetings in the present invention comprise a plurality of pages of information in the form of annotations. These pages are linked together in a manner described in detail in U.S. Pat. No. 5,408,470, filed concurrently with the present application. As a meeting between conference participants progresses, pages of meeting information created in the form of annotations are created and added to the list of pages for the meeting. Upon completion of a meeting, these pages of information are retained on mass storage device 222 under a meeting file identifier. This meeting information may subsequently be recalled using this file identifier.

In the present invention, two page lists are maintained by the meeting manager 410 of each conference participant. A public meeting page list 418 and a private meeting page list 422 is maintained by each conference participant. The public meeting page list 418 is used for the storage of pages that are shared among each of the conference participants. Any of the conference participants may view or manipulate the annotation information maintained in the public meeting page list 418. A current page identifier 420 is used to identify the individual page of page list 418 that is currently being viewed by each of the conference participants. Private meeting page list 422 is used for storage of meeting information that is visible and manipulated only by the conference participant in which the private pages are resident (i.e., the local participant). In this manner, a conference participant may retain information in the private meeting page list 422 that is not visible or manipulated by other conference participants. As described in the above-referenced co-pending patent application, the present invention provides a means for linking the private pages of page list 422 with the public pages of page list 418. The present invention also provides a current page identifier 424 used to identify the private page currently viewable by the local participant.

The meeting manager 410 also manages a participant list 426 which comprises a list of meeting participants. This list 426 defines the set of conference participants currently known to meeting manager 410. This list 426 includes the identity of the arbitrator 428, the identity of the local participant 430, and the identity of other conference participants 432. This content of participant list 426 is illustrated in more detail in FIG. 6.

Figure 6:
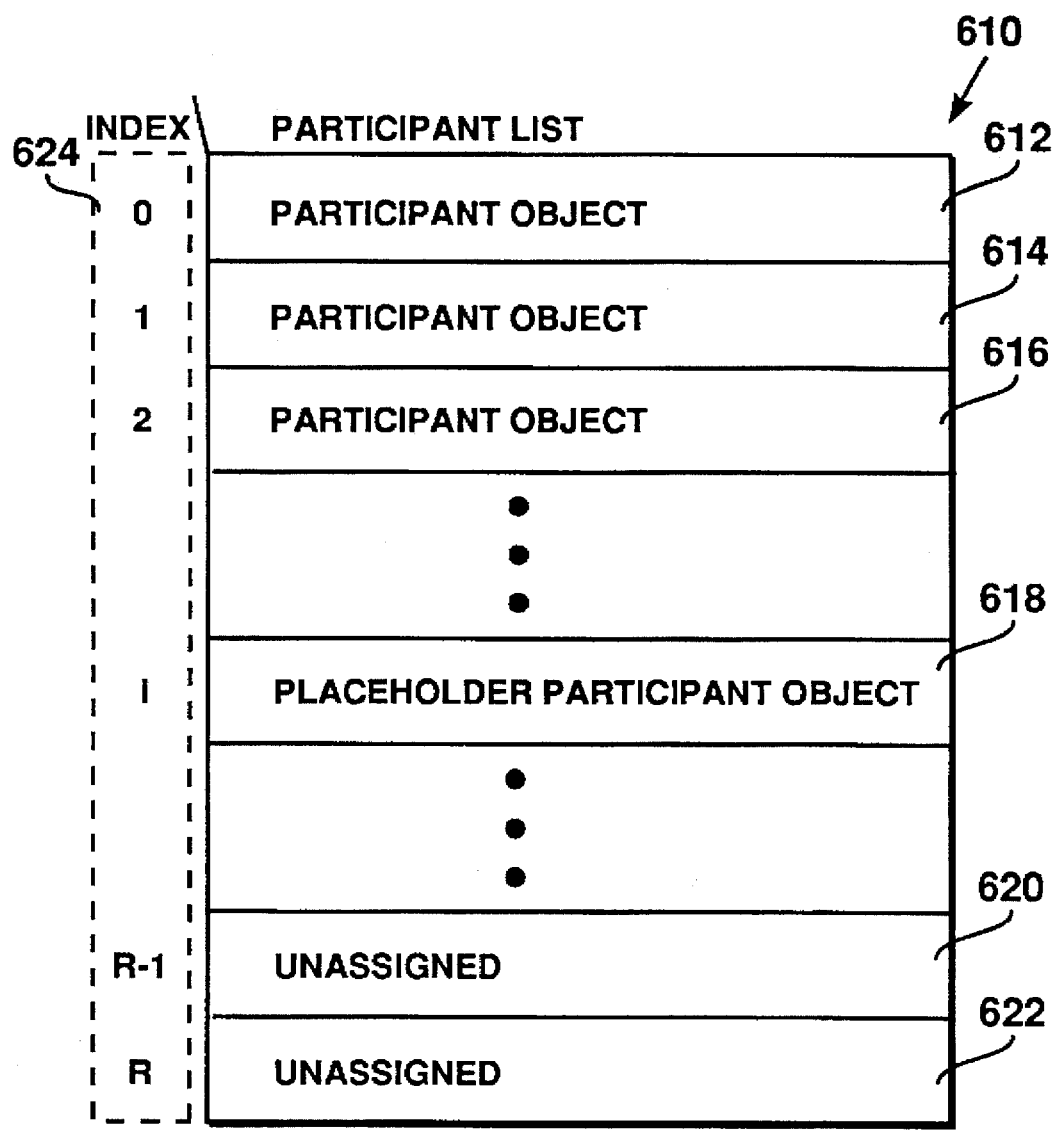
FIG. 6 illustrates the content of the participant list.

Referring now to FIG. 6, the content of the participant list 610 used in the preferred embodiment is illustrated. The meeting manager of each conference participant maintains a current list of conference participants currently connected to a meeting. In order to maintain meeting information synchronization between conference participants, the participant list maintained by each participant should contain the same information. This information comprises a list of participant-identifying information maintained in the form of objects. Because the preferred embodiment of the present invention is written in the C++ programming language, an object is a convenient form for storage of participant information.

Note that the discussion herein of various embodiments refers specifically to a series of routines which are generated in a high-level object-oriented programming language (e.g., the Microsoft C/C++ Version 7.00 language) available from Microsoft, Inc. Redmond, Wash. This series of routines is compiled, linked, and then run as object code in a system such as the one illustrated in FIG. 1. It can be appreciated by one skilled in the art, however, that the following method and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

One of the main benefits of the present invention is that the structure of a meeting is distinct from the meeting data itself. As described above, a meeting is comprised of a participant list, page lists, and annotation lists. These lists and the objects that the lists identify represent the structure of a particular meeting. The actual object data that the identified objects represent is separable from the meeting structure itself. For example, a meeting may include a page which includes a graphic annotation with a given identifier. The graphic annotation itself may comprise a large bitmap of data; however, the meeting structure only needs to represent the graphic annotation by its identifier. The object data is thereby made distinct from the object structure. The separation of object structure from the object data itself provides an optimized merge process. That is, in order to merge meetings, only the structure of the meeting, which is typically small in size, is needed. The large amounts of object data are separated from the meeting structure and the transfer of such data is suppressed during the merge process.

Figure 7:
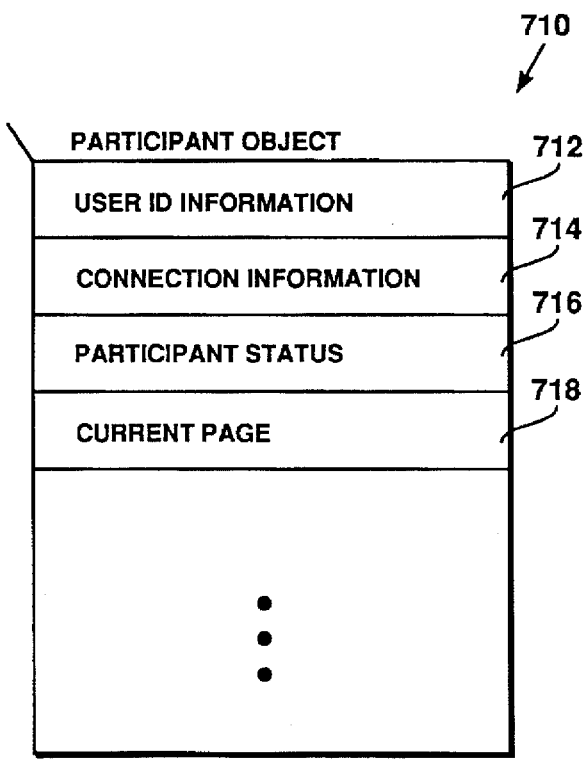
FIG. 7 illustrates the content of a participant object.

Referring now to FIG. 7, the types of participant identifying information maintained in a participant object 710 is illustrated. Participant object 710 comprises user identifying information 712 which includes user name, address, telephone number, and other user identifying information. Participant object 710 also includes connection information 714 used to associate the participant with a particular network channel or input/output port on the communication medium. Participant status defines the current state of the participant with whom participant object 710 is associated. The current page information 718 defines the current public meeting page and the current private meeting page as described in connection with FIG. 4. It will be apparent to one of ordinary skill in the art that other information pertinent to a particular conference participant may be maintained within participant object 710.

Figure 8:
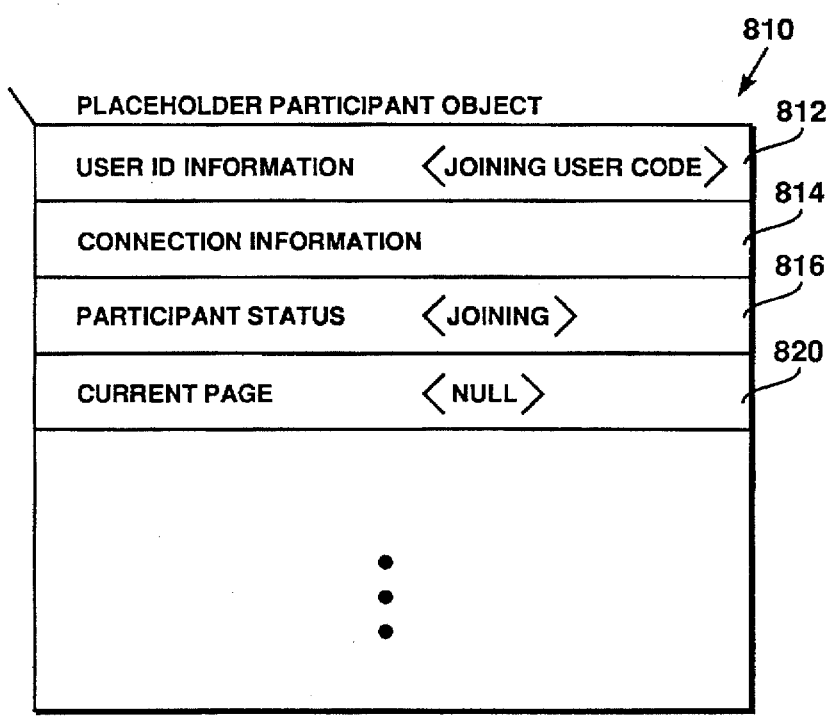
FIG. 8 illustrates the content of a placeholder participant object.

Referring now to FIG. 8, a variation of the participant object data structure is defined for a placeholder participant object 810. Placeholder participant object 810 is used for joining conference participants while the joining participant is being merged into the meeting and before all other conference participants become aware of the joining participant. The placeholder participant object 810 is used as a place holder in participant list 610 until a full participant object 710 can be generated for the joining participant. Once this occurs, the placeholder participant object 810 is replaced by the corresponding participant object 710 in participant list 610. This process is described in more detail below in connection with the flowcharts of the processing logic of the present invention.

The "placeholder" participant object has the same structure as participant object as shown in FIG. 7; however, the placeholder participant may only contain connection information, while the remaining information, such as name, current page, etc. is yet unknown. The importance of the placeholder participant object is to maintain every conference participant's participant list in the same order as the arbitrator participant's participant list. By this mechanism, messages between conference participants may identify and retrieve information in the participant list based on the participant list index which is assigned by the arbitrator participant as described in connection with FIG. 14.

Placeholder participant object 810 includes the same information as a participant object such as user identifying information 812. For a joining participant however, the user identifying information may not be immediately available. In this case, a joining user code can be used in user identifying information 812 to specify the user identifying information 812 as being undefined. Connection information 814 is typically available for a joining participant as the connection is made through communications interface 216. The participant status 816 is set to a joining state for a joining participant and current page 820 is set to a null or unassigned value.

Referring again to FIG. 6, participant list 610 includes a list of participant objects (for example, participant objects 612, 614 and 616). Participant list 610 also includes a list of joining of participant objects (for example, placeholder participant object 618). Participant list 610 also includes space for other participant objects (for example, unassigned locations 620 and 622) as other conference participants join a meeting.

Each participant object (and therefore each conference participant) is assigned a unique participant list index 624. The participant list index 624 identifies the location of a participant object within participant list 610. As newly connected participants join a meeting, the joining participant is assigned a location in participant list 610 and assigned a corresponding participant list index 624. The joining participant uses the allocated participant list index during the process of merging into the meeting. This merge process is described in detail below in connection with the flowcharts of the present invention.

Figure 9:
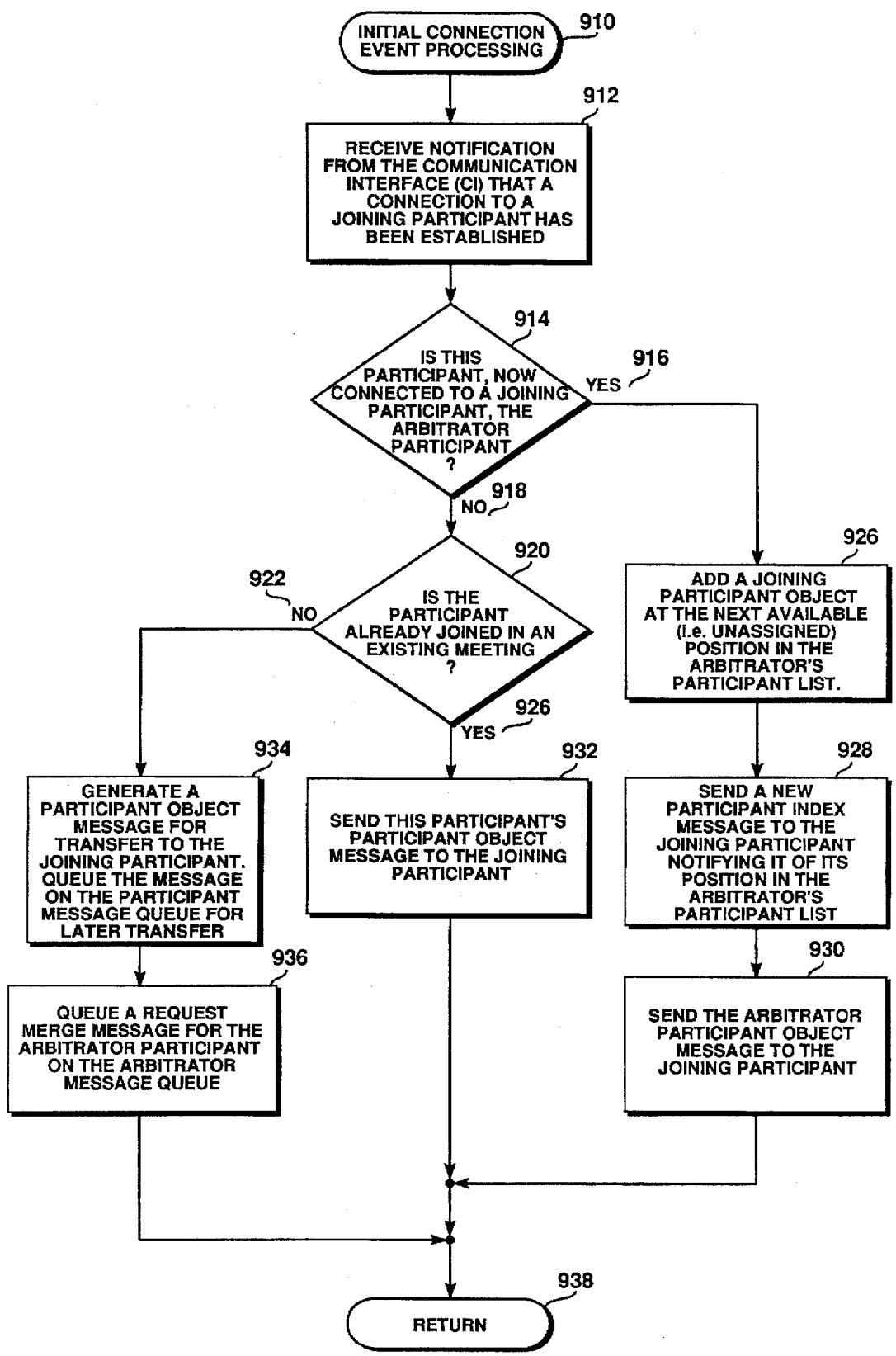
FIG. 9 is a flowchart illustrating the processing logic for the initial connection event as processed by the present invention.

Referring now to FIG. 9, a flowchart describes the processing logic for an initial connection event as a joining participant initially is connects to an existing conference participant through communication medium 110 and communications interface 216. Communications interface 216 recognizes and initial connection by a joining participant in a conventional manner. This initial connection event may be an initial network message from a new participant or a telephone call received via a telephone modem. Once communications interface 216 establishes a low level connection with the joining participant, communications interface 216 notifies the meeting manager 210 via interface 236 in processing block 912. The existing conference participant receiving the initial connection event checks its arbitrator participant status variable 323 or 327 to determine if the receiving participant is the arbitrator (decision block 914). If the receiving participant is the arbitrator, processing path 916 is taken to processing block 926 where a placeholder participant object is allocated in participant list 610 at the next available (i.e. unassigned) position in the arbitrator's participant fist. The participant list index of the joining participant is retained. This participant list index is included in a network message generated by the arbitrator and sent to the joining participant via communications medium 110. This message with the new participant index notifies the joining participant of its position in the arbitrator's participant list (processing block 928). Having sent a participant index message to the joining participant, the arbitrator then sends a copy of its own arbitrator participant object to the joining is participant in an arbitrator participant object message in processing block 930. Processing for an initial connection event received by an arbitrator participant then terminates through return bubble 938 illustrated in FIG. 9.

Figure 10:
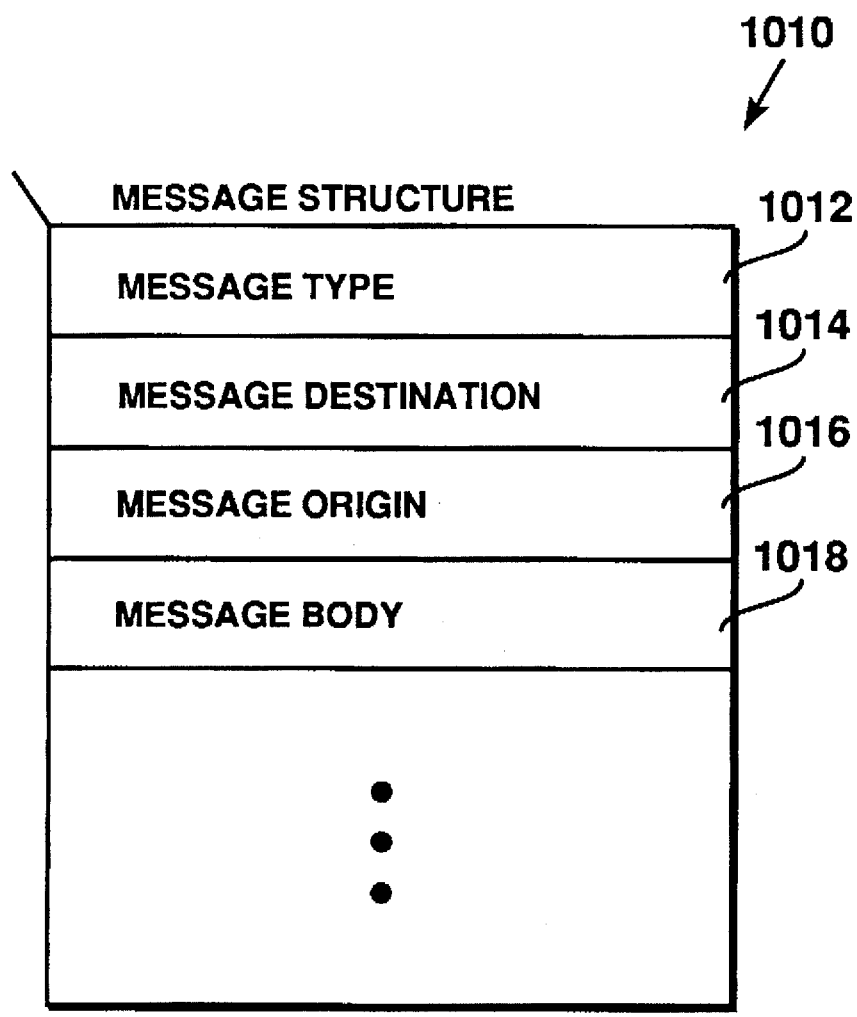
FIG. 10 illustrates the content of a message as transferred in the present invention.
Figure 11:
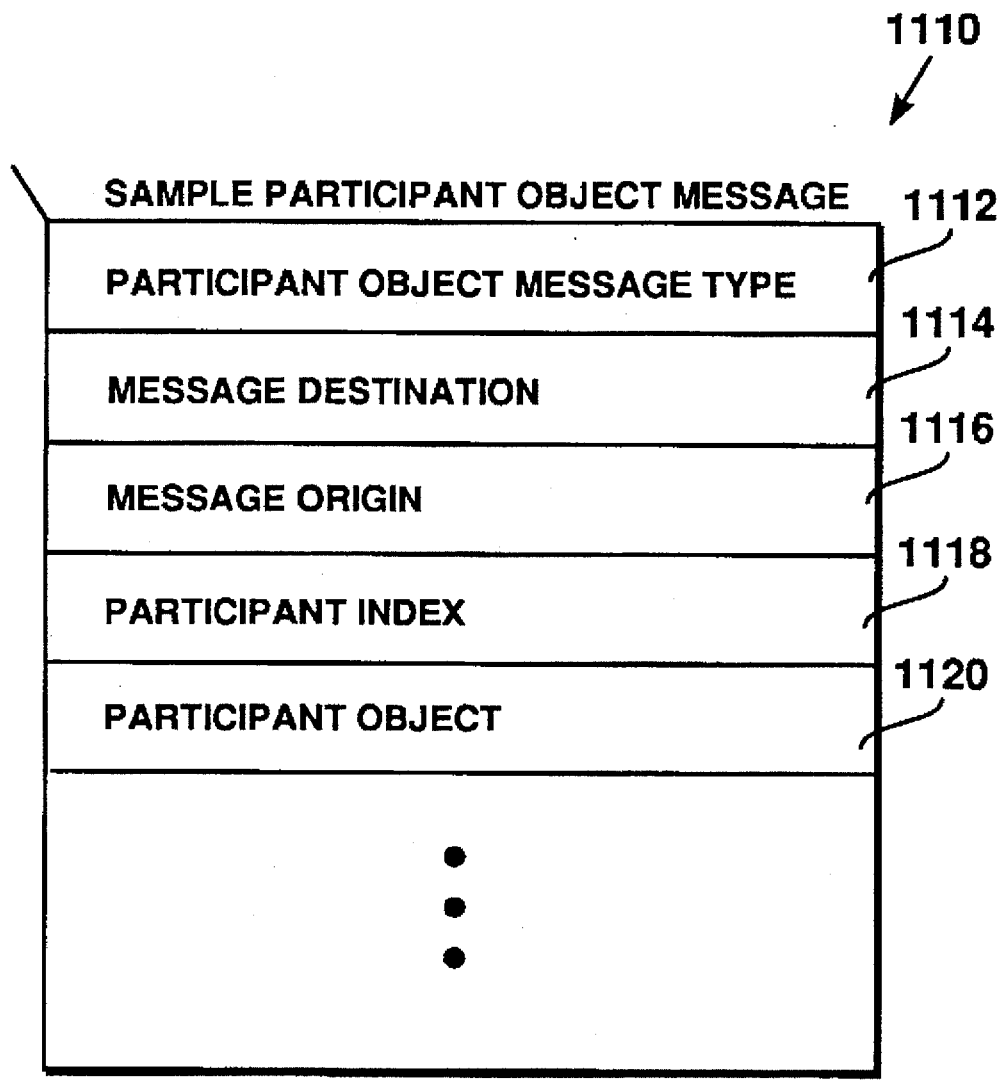
FIG. 11 illustrates a sample participant object message.

Digressing briefly to FIGS. 10 and 11, a description of the message structure used for passing messages across communication medium 110 is illustrated. In the preferred embodiment, the message structure 1010 comprises a message type 1012, a message destination address 1014, a message origin 1016, and a message body 1018 which comprises the content of the information being passed in the message. Conventional techniques are known for passing messages across a network or communication medium using a message structure of the type illustrated in FIG. 10. It will be apparent to one of ordinary skill in the art that alternative message structures may be used for passing messages from one conference participant to another across the communication medium 110. By way of example, FIG. 11 illustrates a sample participant object message 1110 such as the participant object message sent by the arbitrator in processing block 930. The sample participant object message 1110 comprises a unique participant object message type 1112. This message type uniquely identifies the message as being a participant object message. Other unique message types identify a particular message as being of a different type. A sample list of other message types is presented in FIG. 15b. Sample participant object message 1110 also includes message destination 1114 and message origin 1116. The destination and origin fields identify the receiver and the sender of the message. The message body of the participant object message 1110 comprises the participant index 1118 and the participant object information 1120. The participant index 1118 identifies the participant index within the sender's participant list where the participant object being sent is located. Participant object 1120 comprises the participant information being provided by the sending participant. This participant object information 1120 comprises information similar to the information illustrated in FIG. 7 and described above. It will be apparent to one of ordinary skill in the art that the sample participant object message 1110 illustrated in FIG. 11 may include other information relevant to a particular participant object.

Referring again to FIG. 9, the description of the initial connection event processing continues at decision block 914. If the conference participant receiving the initial connection from a joining participant is not the arbitrator participant, processing path 918 is taken to decision block 920. In this case, if the receiving participant is part of an existing meeting (processing path 926), the receiving participant checks its participant list for the presence of a participant object or a placeholder participant object with a connection identifier corresponding to the connection information received from the joining participant. If a corresponding object is found in the receiving participant's list, processing path 924 is taken to processing block 932. In this case, the joining participant was already previously connected as part of an existing meeting. The receiving participant copies its own participant object information into a participant object message and sends the receiving participant object to the joining participant in processing block 932. This action allows the joining participant to update its participant list with the participant object of the participant with which it was connected. Processing for the initial connection event then terminates through return bubble 938.

Referring again in FIG. 9 to decision block 920, if the receiving participant is not already in an existing meeting, processing path 922 is taken to processing block 934. In this case, the joining participant was not previously connected as part of an existing meeting. Thus, the receiving participant will need to be merged into the existing meeting. The merge process requires action by the arbitrator participant. Because the receiving participant is not the arbitrator participant as determined in processing block 914, the receiving participant needs to queue messages to the joining participant to allow time for the arbitrator participant to intervene and assign the joining participant a location in the participant list. For this reason, the receiving participant copies its own participant object into a participant object message and queues the message on the participant message queue for later transfer to the joining participant (processing block 934). In addition, the receiving participant queues a Request Merge message for the arbitrator participant on the arbitrator message queue in processing block 936. The Request Merge message is processed by the arbitrator participant in a manner described below in connection with FIGS. 17 through 19. Processing for the initial connection event then terminates through return bubble 938.

Figure 12:
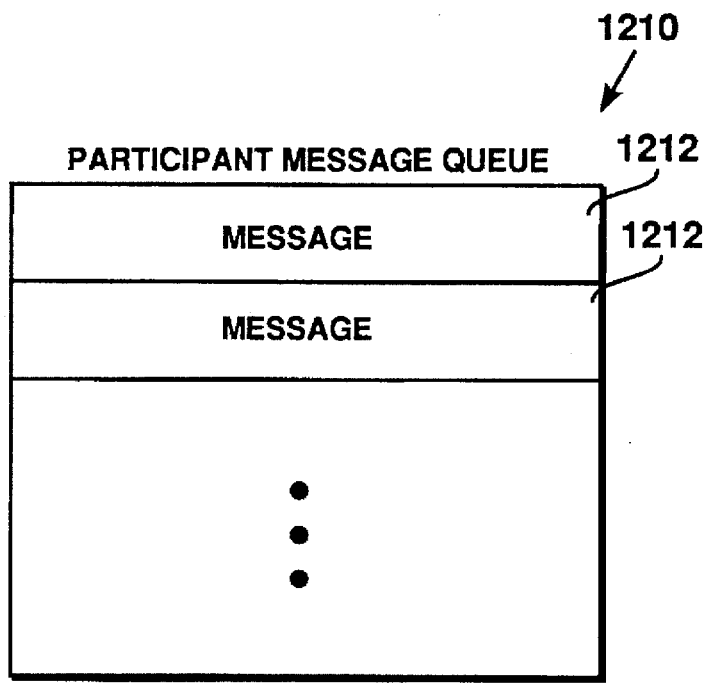
FIG. 12 illustrates the participant message queue
Figure 13:
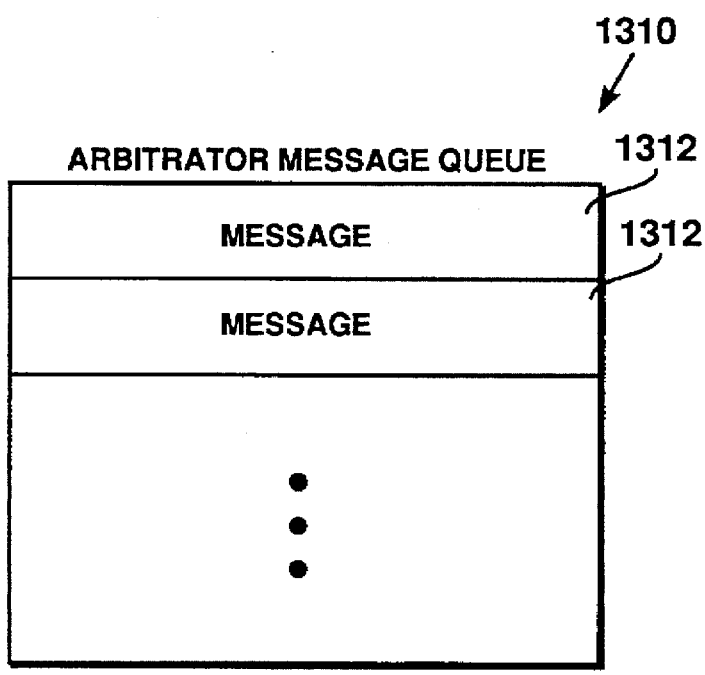
FIG. 13 illustrates the arbitrator message queue.

Referring now to FIGS. 12 and 13, the participant message queue 1210 and the arbitrator message queue 1310 is illustrated. Each conference participant maintains a queue of messages for transfer to other conference participants. The participant message queue 1210 comprises a plurality of messages 1212 which are awaiting transfer across communication medium 110. Each message in participant message queue 1212 comprises information in a form illustrated in FIG. 10 and described above. A conventional queue pointer (not shown) identifies the next message in the message queue to be removed and transferred across communication medium 110 to a destination participant identified within the message. Another conventional queue pointer (not shown) identifies the next available location in the message queue at which a message may be stored.

Referring to FIG. 13, a similar message queue 1310 exists in the arbitrator participant. The arbitrator message queue 1310 retains messages for transfer to other conference participants. The content and management of arbitrator message queue 1310 is the same as the content and management of participant message queue 1210. Conventional techniques exist for managing a message queue of this form. It will be apparent to one of ordinary skill in the art that other mechanisms exist for temporarily storing messages for transfer across a communication medium.

Figure 14:
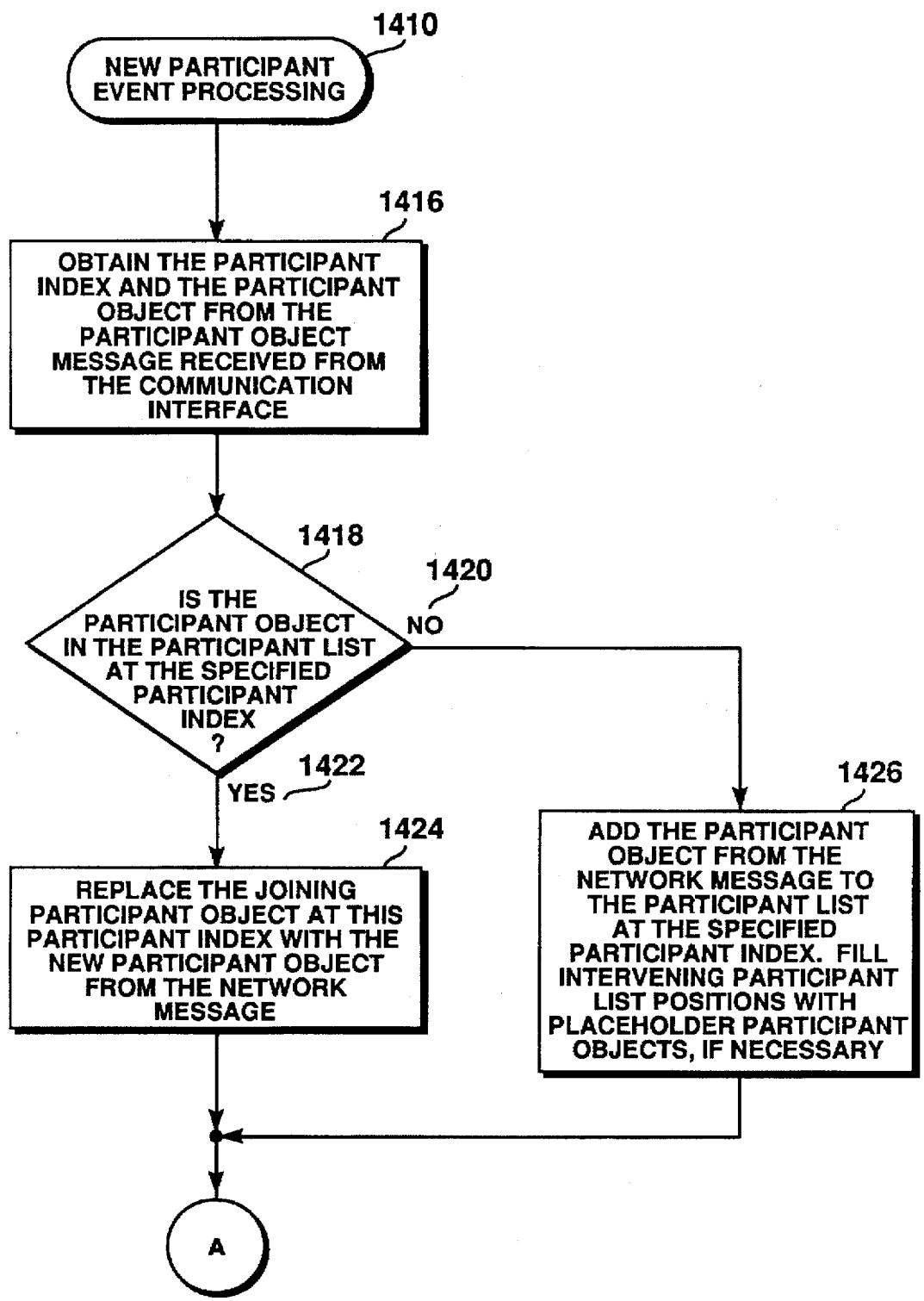
FIGS. 14 and 15a illustrate the processing logic used in the present invention for processing a new participant event.
Figure 15A:
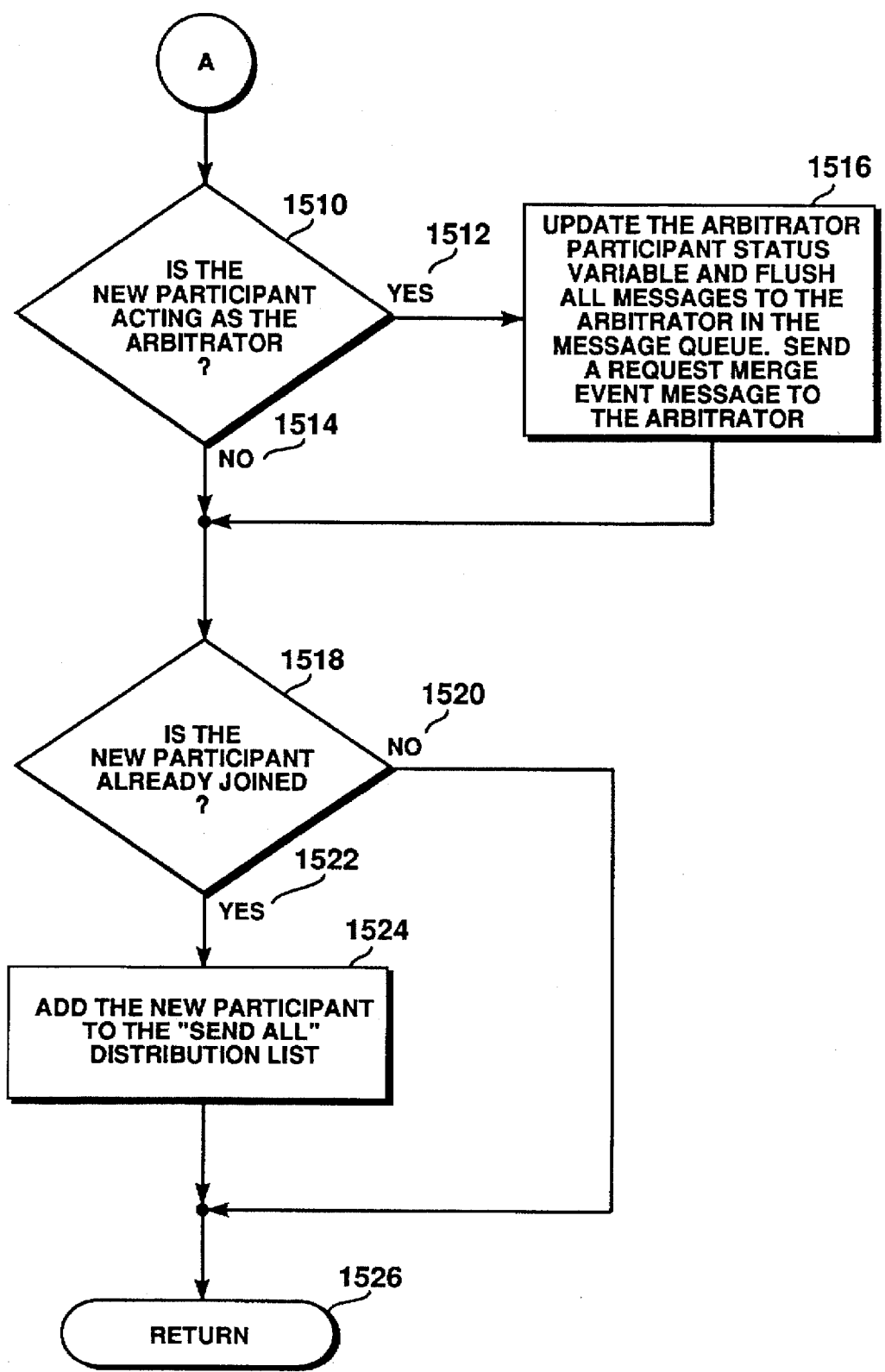
Figure 15B:
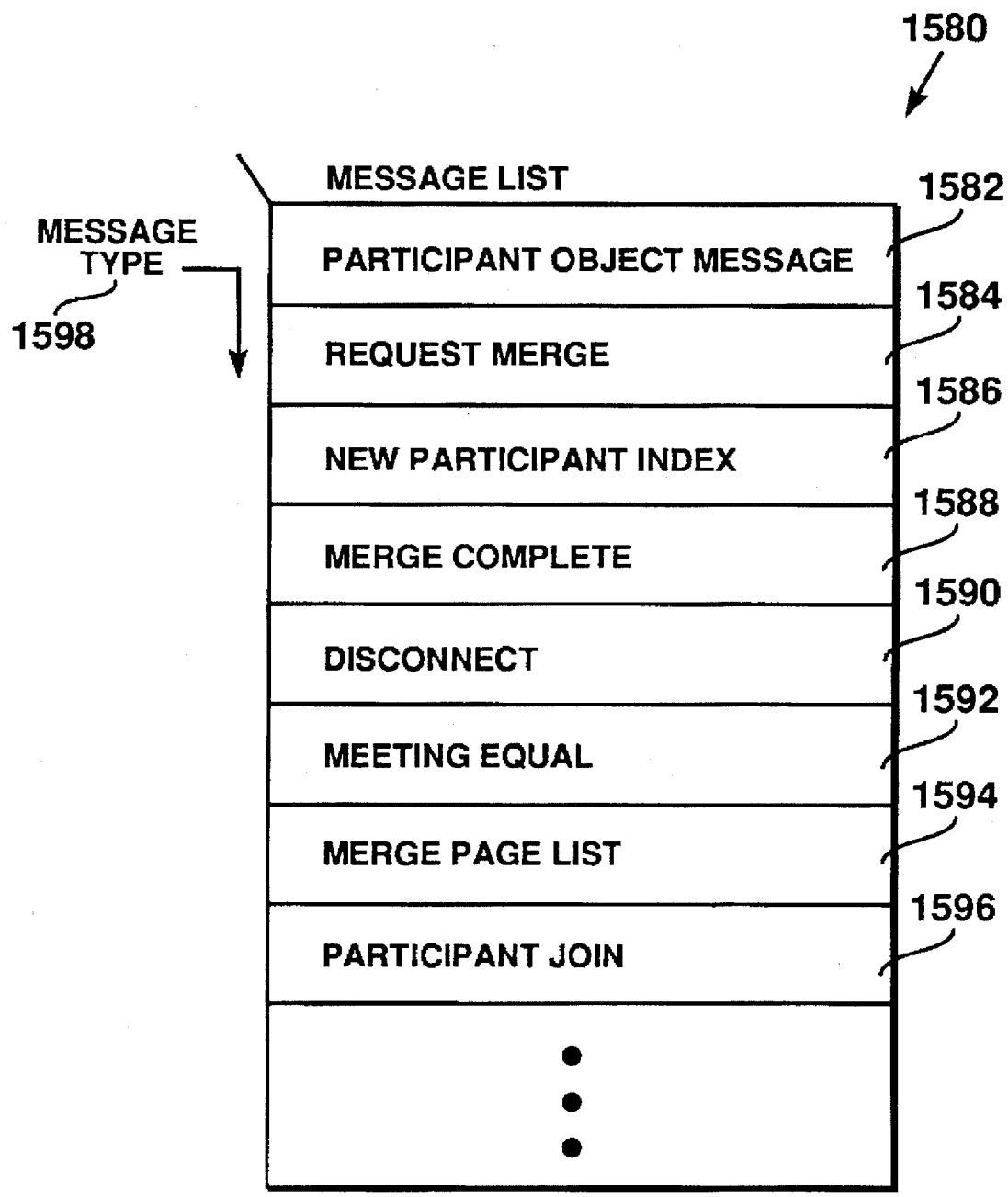
FIG. 15b illustrates the content of a message list.

Referring now to FIGS. 14 and 15a, flowcharts illustrate the processing flow for processing a new participant event. A new participant event results when a participant object message is sent from one conference participant to a receiving conference participant. Such a participant object message was generated in the initial connection event as described above in connection with the processing blocks 930 and 934 illustrated in FIG. 9. In FIG. 14, the receiving participant receives notification from its communication interface that a network message is ready to be read from the communication medium. The incoming message is obtained from the communication interface and the type of message is determined using a message type. In this case, the message is a participant object message. The participant index is extracted from the participant object message in processing block 1416. The received participant object transferred in the message is also extracted from the participant object message in processing block 1416. The receiving participant then accesses its own participant list to determine if the received participant object resides in the participant list at the participant index received in the message (decision block 1418). If the participant object exists in the participant list at the specified participant index, processing path 1422 is taken to processing block 1424. In this case, the received participant object has already been allocated a position in the participant list. This allocation occurred as a result of a previously processed new participant index message as described below in connection with FIG. 16. During the new participant index event processing, a placeholder participant object was stored in the receiving participant's participant list at the participant index position allocated to it. Because the actual participant object corresponding to the previously stored placeholder participant object has been received in the participant object message, the placeholder participant object is replaced by the newly received participant object at the specified participant index in the receiving participant's participant list (processing block 1424). Processing for the new participant event then continues at the bubble labeled A illustrated in FIG. 15a.

Referring again in FIG. 14 to decision block 1418, processing path 1420 is taken if the received participant object does not reside in the participant list at the participant index specified in the message. In this case, a position in the participant list at the specified participant index is allocated for the received participant object. Intervening unassigned positions in the participant list are filled with placeholder participant objects, if necessary (processing block 1426). By filling intervening participant list positions with placeholder participant objects, the participant list in each conference participant will eventually be equal once each conference participant receives the participant object sent by each of the other conference participants. In this manner, the present invention has the advantage that no implied order of messages is imposed on the conference participants. Thus, the present invention envisions a communication medium in which messages passed between conference participants may be sent in any arbitrary order, yet still processed correctly. Processing for the new participant event continues at the bubble labeled A illustrated in FIG. 15a.

Referring now to FIG. 15a, processing for the new participant event continues at bubble labeled A. In decision block 1510, the participant status received in the participant object is cheched to determine if the participant corresponding to the received participant object is acting as the arbitrator participant. If this is the case, processing path 1512 is taken to processing 1516. In this case, the receiving participant updates it arbitrator participant status variable 323 or 327 to identify the participant corresponding to the received participant object as the arbitrator participant. Because the identity of the arbitrator participant has up to this event has been unknown or may have changed, the messages for the arbitrator previously stored in the participant's message queue are flushed. A Request Merge event message is sent or queued to the new arbitrator in processing block 1516. The Request Merge event message will trigger the arbitrator to synchronize the information between conference participants. The processing performed for a Request Merge event message is described below in connection with FIGS. 17 through 19.

Referring again to decision block 1510, if the participant corresponding to the received participant object is not acting as the arbitrator, processing path 1514 is taken to decision block 1518. If a participant join message has previously been received for the new participant corresponding to the received participant object, processing path 1522 is taken to processing block 1524. In this case, the new participant is added to a send all distribution list (processing block 1524). The send all distribution list identifies a list of participant connection addresses which are identified by a single handle. Adding a participant to the "send all" distribution list is accomplished by sending a message to the communications interface. This message contains the existing "send all" distribution list handle and the connection address which has been previously stored in the participant object. Thus, broadcast messages sent using the "send all" distribution list handle, will also be sent to the newly added conference participant. If a participant join message has not previously been sent, processing path 1520 is taken to bypass adding the new participant to the send all distribution list. Processing for the new participant event then terminates through return bubble 1526.

Figure 16:
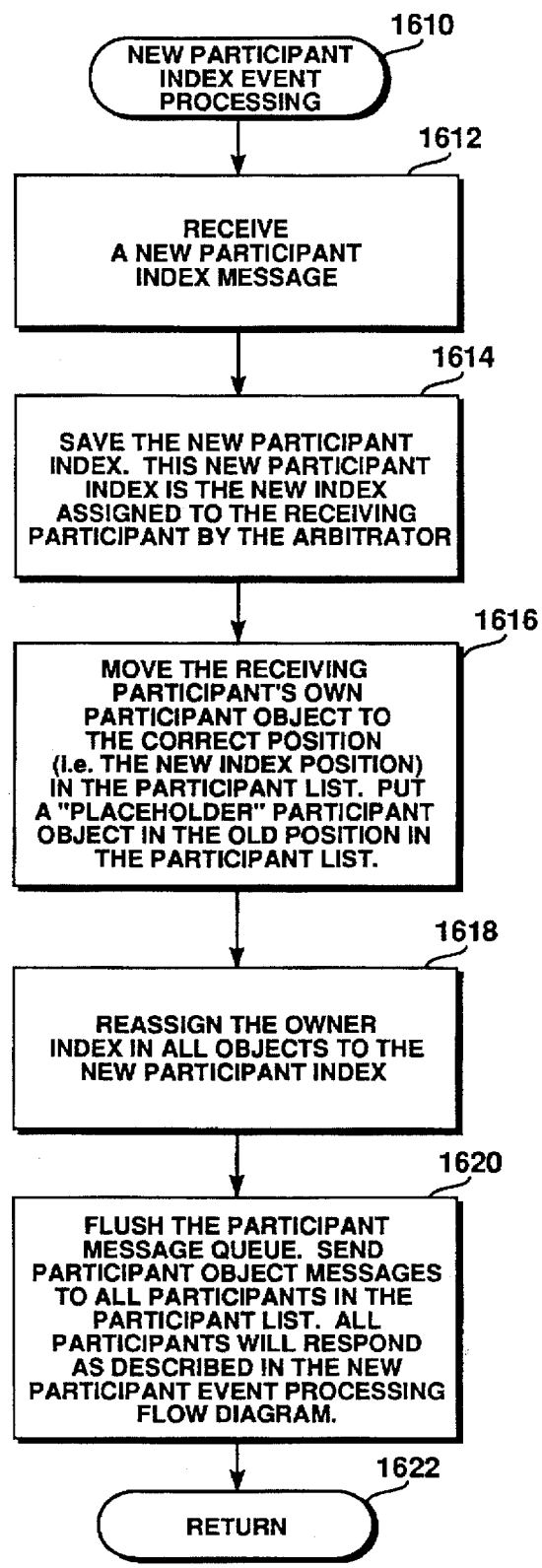
FIG. 16 illustrates the processing used in the present invention for processing a new participant index event.

Referring now to FIG. 16, processing for a new participant index event is illustrated. A new participant index event is used to allocate a position in a conference participant's participant list. The participant index event message is received from the communication interface in processing block 1612. The arbitrator participant is typically the originator of a new participant index message. The arbitrator uses this message to assign a new participant list index to the participant receiving the new participant index message. The new participant index event capability allows the arbitrator to dynamically manage the participant lists of each of the other conference participants. The new participant index received in the new participant index message is saved in processing block 1614. This new participant index is the new index assigned to the receiving participant by the arbitrator. The receiving participant's own participant object residing in the participant list at an old participant index is moved to a new position corresponding to the new participant index. A placeholder participant object is stored in the old index position in the participant list (processing block 1616). The placeholder participant object keeps the position of objects in all conference participant's participant list the same. An owner index in all objects is reassigned to the new participant index in processing block 1618. All objects maintained within the receiving participant carry an owner index that defines the participant index of the participant to which the object is assigned. These objects include pages and annotations which are controlled by the owning participant. Reassigning the owner index allows these objects to be associated with the new participant index. In processing block 1620, the participant message queue of the receiving participant is flushed. Participant object messages having the new participant index are generated by the receiving participant and sent to all other conference participants in processing block 1620. In this manner, other conference participants become aware of the new participant index of the receiving participant. Other conference participants will acknowledge the transmission of the receiving objects participant object message by sending their own participant object messages thereby generating a new participant event as described in connection with FIGS. 14 and 15a. Processing for the new participant index event then terminates through return bubble 1622.

Figure 17:
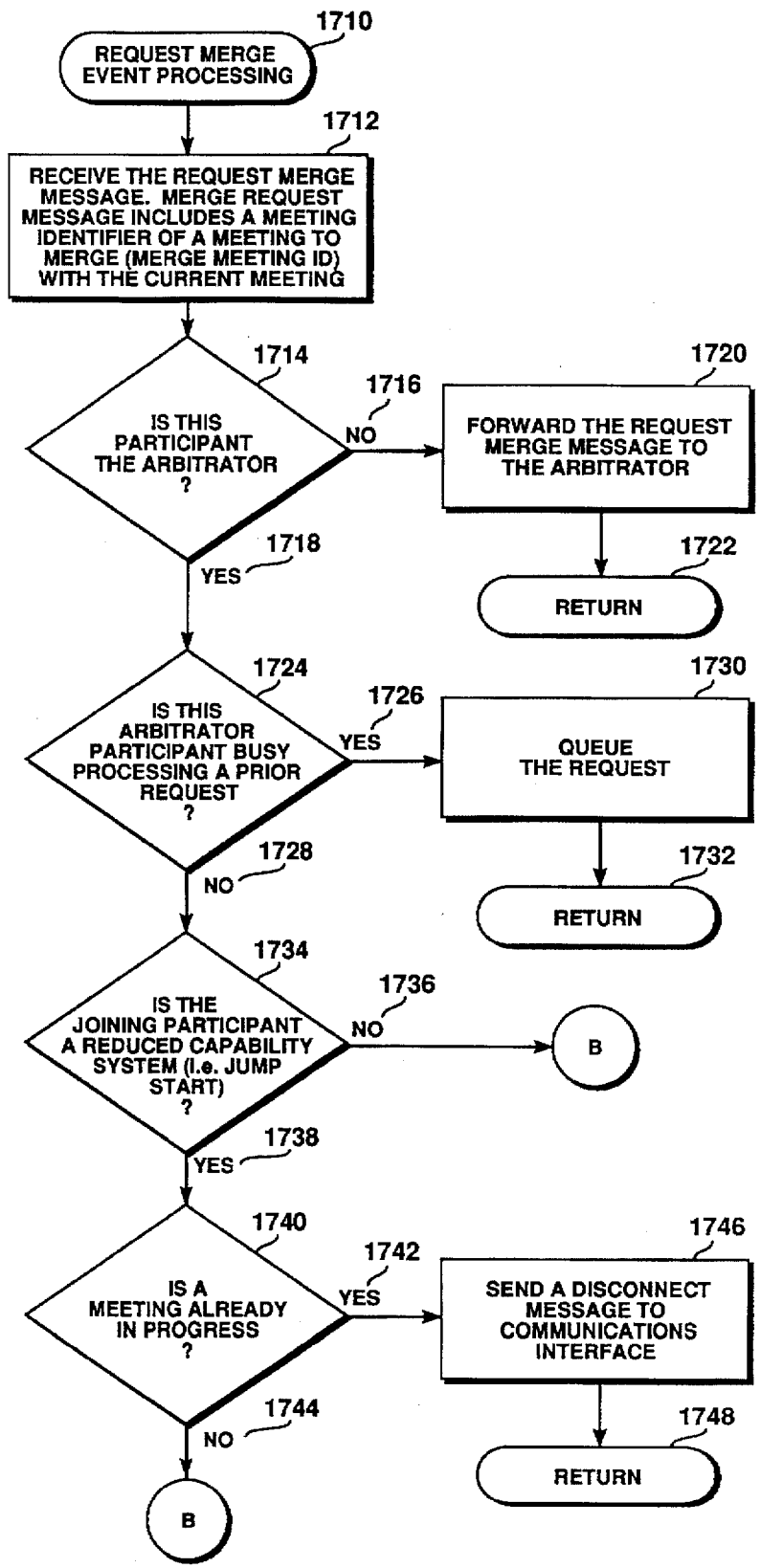
FIGS. 17 through 19 illustrate the processing used in the present invention for processing a request merge event.
Figure 18:
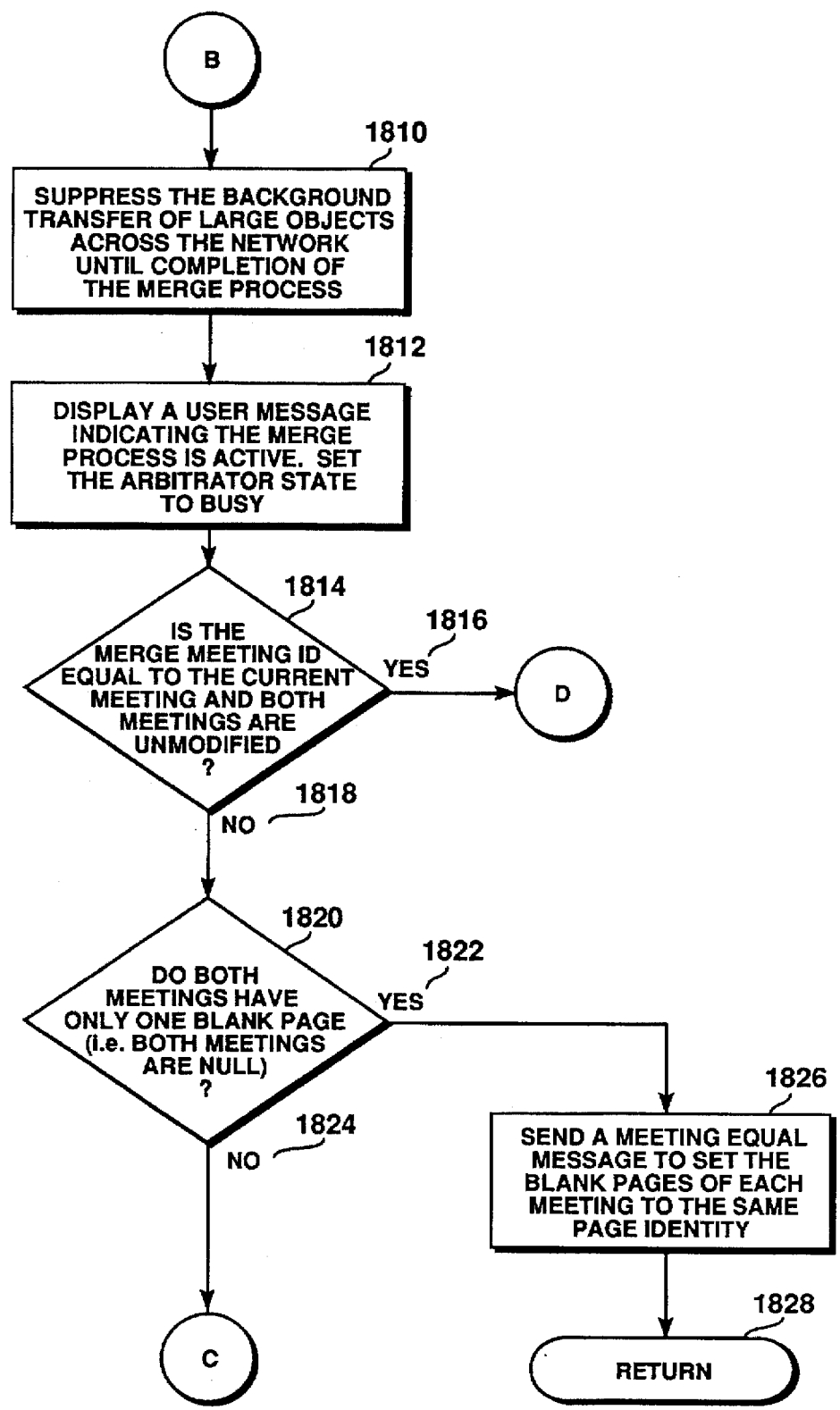
Figure 19:
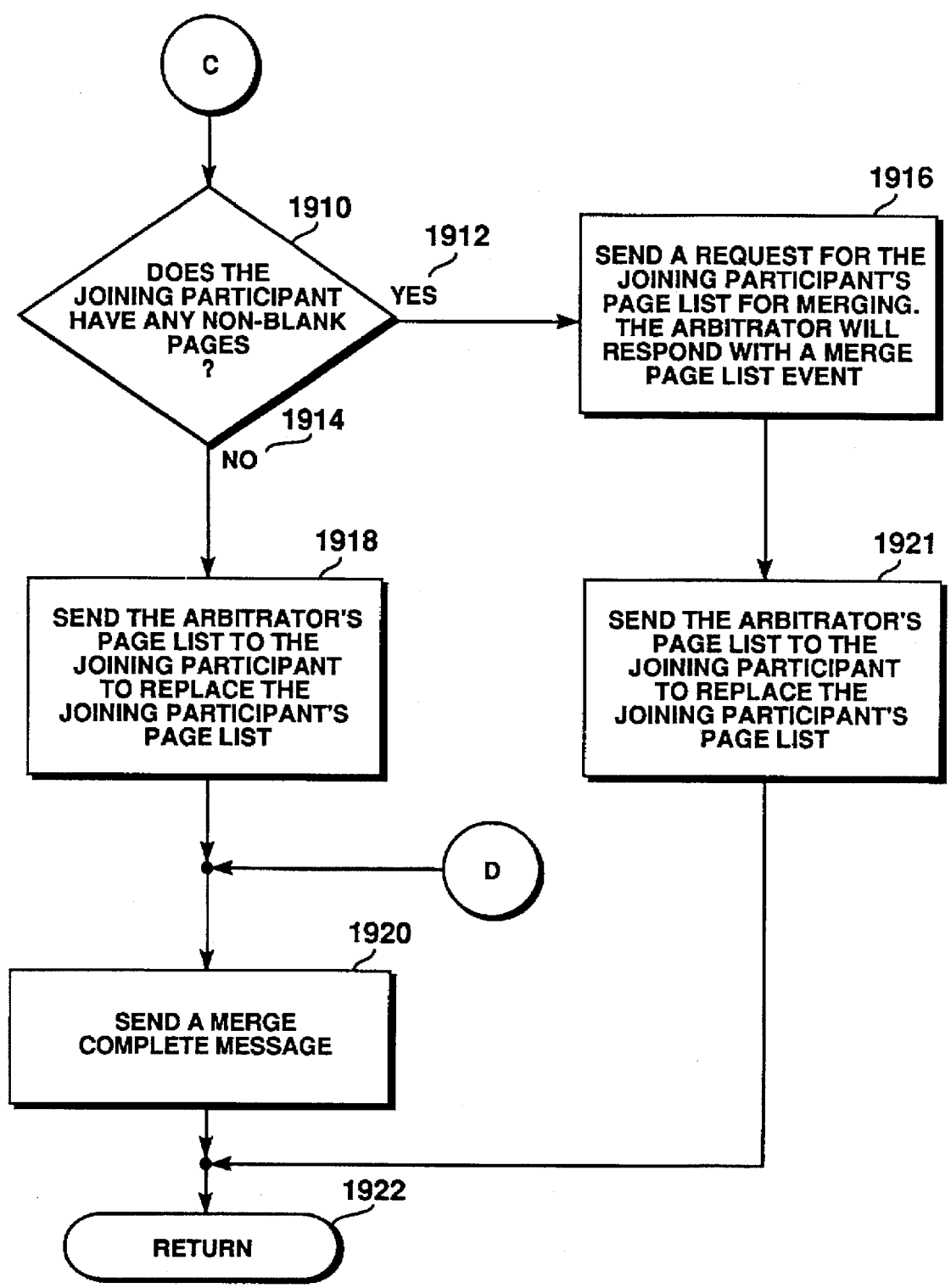

Referring now to FIGS. 17 through 19, the Request Merge event processing of the present invention is illustrated. The Request Merge message is used by a joining participant to request the arbitrator participant to merge the joining participant into the current meeting. The Request Merge message is received by the arbitrator participant from its communication interface in processing block 1712. The content of the Merge Request message includes a meeting identifier which identifies the contents of meeting information to merge into the current meeting. In this manner, a joining participant may enter a meeting with a set of previously generated meeting pages which are added into the current set of meeting pages. Thus, the present invention has the advantage that current conference participants may gain the benefit of information previously generated and provided by a joining participant. At the same time, the joining participant benefits by receiving the information generated during the course of an ongoing meeting. If the participant receiving the Request Merge message is not the arbitrator, processing path 1716 is taken to processing block 1720 where the Request Merge message is forwarded to the arbitrator participant and the receiving participant returns in bubble 1722 with no further action. If the receiving participant is the arbitrator, processing path 1718 is taken to decision block 1724. In some situations, the arbitrator participant is busy processing a previously received message. In this case, processing path 1726 is taken and the Request Merge message is queued for processing by the arbitrator at a future time (processing block 1730). Processing in this case returns through return bubble 1732. If the arbitrator participant is not busy, processing path 1728 is taken to decision block 1734. The present invention provides a means for implementing a reduced capability meeting manager denoted Jump Start. This reduced capability system does not provide the capability to merge a joining participant after a meeting has already begun. Thus, if the joining participant requesting a merge operation joins a meeting already in progress, processing path 1742 is taken to processing block 1746 where a disconnect message is sent to the joining participant and the Request Merge processing terminates through return bubble 1748. The reduced capability system, which is incapable of performing the full merge capabilities of the full system, is purposely reduced in capability to provide a lower cost system. If the joining participant is not a reduced capability system or a meeting is not already in progress, processing for the Request Merge event continues through the bubble labeled B illustrated in FIG. 18.

Referring now to FIG. 18, processing for a Request Merge message continues at the bubble labeled B. At this point, the arbitrator participant, which is processing the Request Merge message, is ready to begin the merge process. The first step in this process is to suppress the background transfer of large objects or large data blocks across the communication medium until completion of the merge process (processing block 1810). As described earlier, one of the main benefits of the present invention is that the structure of a meeting is distinct from the meeting data itself. The separation of object structure from the object data itself provides an optimized merge process. That is, in order to merge meetings, only the structure of the meeting, which is typically small in size, is needed. The large amounts of object data are separated from the meeting structure and the transfer of such data is suppressed during the merge process. Following completion of the merge process, data transfer of the object data for large objects is resumed and requests for necessary data transfers are processed. Two benefits of the separation of object structure from object data follow in the present invention. First, the merge process completes more quickly allowing the participants to continue with their tasks. Secondly, if transfer of the object data is not needed, because each participant already contains duplicate copies of the object, subsequent object data transfers are avoided. By suppressing the background transfer or low priority transfer of large object data blocks, the entire bandwidth of the communication medium may be employed to facilitate the merge process. This allows the merge process to be completed more quickly.

In processing block 1812, a message is displayed to the arbitrator participant that the merge process is active. The arbitrator state is set to a busy condition to prevent subsequently received Request Merge messages from interrupting the current merge process (processing block 1812). In decision block 1814, the meeting identifier provided in the Request Merge message is compared with the currently active meeting identifier. If the merge meeting identifier is equal to the current meeting identifier and both meetings are unmodified, no merge operation is required. In this case, processing path 1816 it taken to the bubble labeled D illustrated in FIG. 19 where a merge complete message is sent to the participant requesting merge (processing block 1920) and processing terminates through return bubble 1922. If, however, the merge meeting identifier is not equal to the current meeting identifier or the contents of either meeting have been modified, processing path 1818 is taken to decision block 1820. If both the merge meeting and the current meeting have only one blank page, both meetings are considered empty or null. In this case, processing path 1822 is taken to processing block 1826 where a meeting equal message is sent to the participant requesting the merge to notify that participant to set the blank pages of each meeting to the same page identifier. Processing then terminates through return bubble 1828. If the current meeting or the merge meeting contains non-blank pages, processing 1824 is taken to the bubble labeled C illustrated in FIG. 19.

Figure 22:
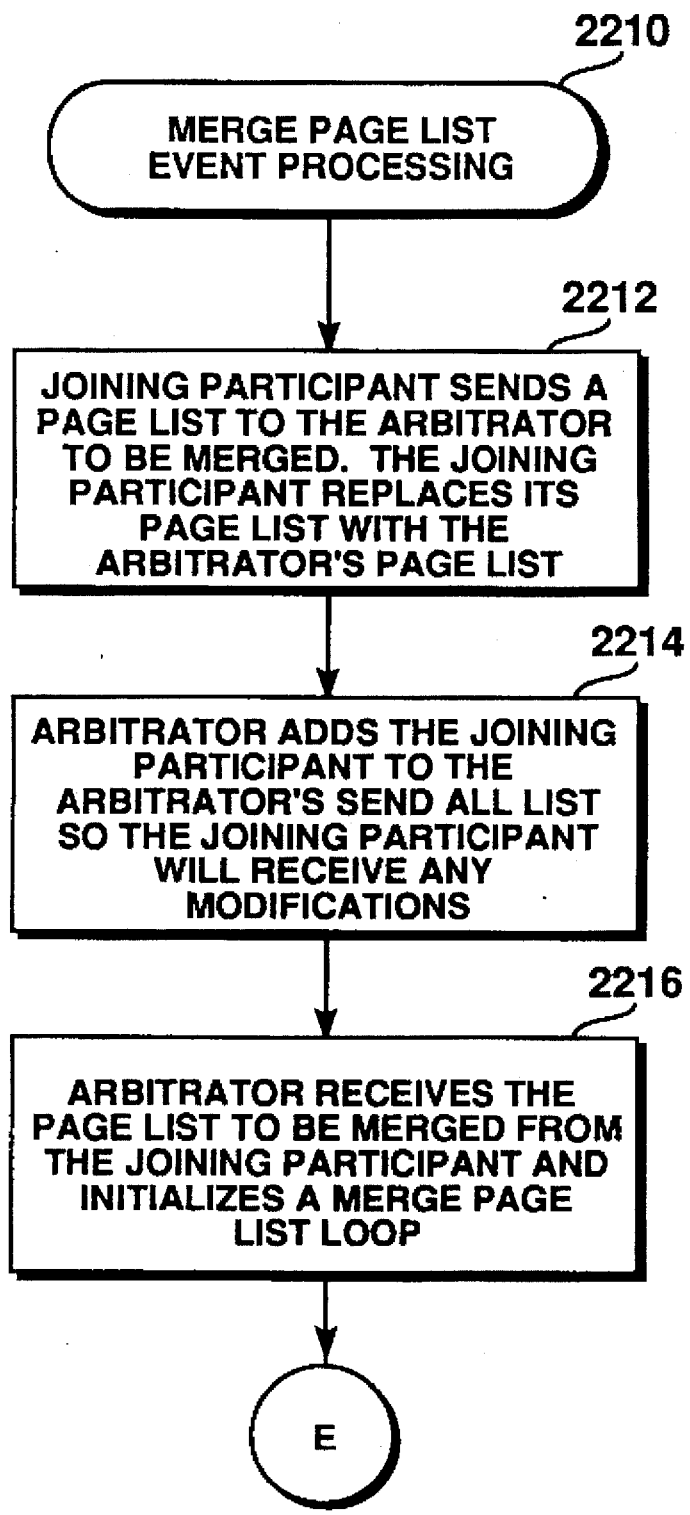
FIGS. 22 and 23 illustrate the processing logic used in the present invention for handling a merge page list event.
Figure 23:
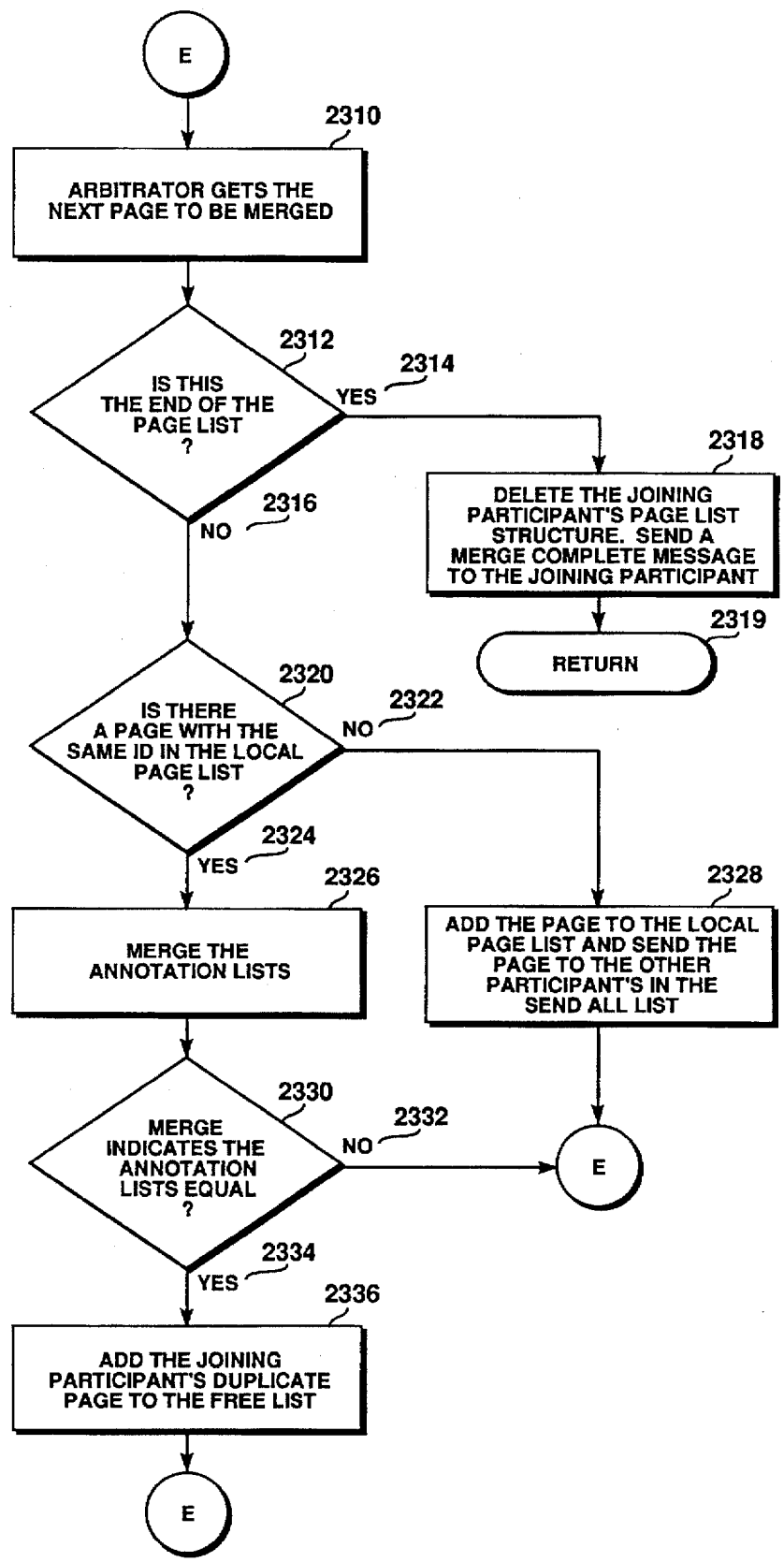

Referring now to FIG. 19, processing for a Request Merge message continues at the bubble labeled C. Continuing the merge process, if the joining participant has any non-blank pages, processing path 1912 is taken to processing block 1916. In this case, the joining participant is entering a conference with its own set of meeting pages that must be merged into the current meeting pages of each of the other existing conference participants. To accomplish this task, the arbitrator participant sends a request to the joining participant to request the joining participant to send its page list to the arbitrator (processing block 1916). The page list sent by the joining participant will be merged by the arbitrator into the current meeting. The joining participant will respond back to the arbitrator by sending a Merge Page List message to the arbitrator (processing block 1916). The processing performed by the arbitrator in response to a Merge Page List message is illustrated in FIGS. 22 and 23. Once the arbitrator has received the joining participant's page list, the arbitrator's page list is sent to the joining participant to replace the joining participant's page list (processing block 1921). Processing for the Request Merge event then terminates through the return bubble 1922. If processing path 1912 is taken, the receipt of the joiner participant's page list for the merge page list event, FIGS. 22–25, will happen asynchronously at a later time and the "send merge complete message", processing block 1920 will not be executed.

Referring still to FIG. 19, if the joining participant has no non-blank pages (processing path 1914), processing block 1918 is executed. The arbitrator sends the current meeting page list to the joining participant in processing block 1918. The joining participant replaces its meeting page list with the page list received from the arbitrator. The arbitrator sends a Merge Complete message to the joining participant in processing block 1920. Processing for the Request Merge event then terminates through the return bubble 1922.

Figure 20:
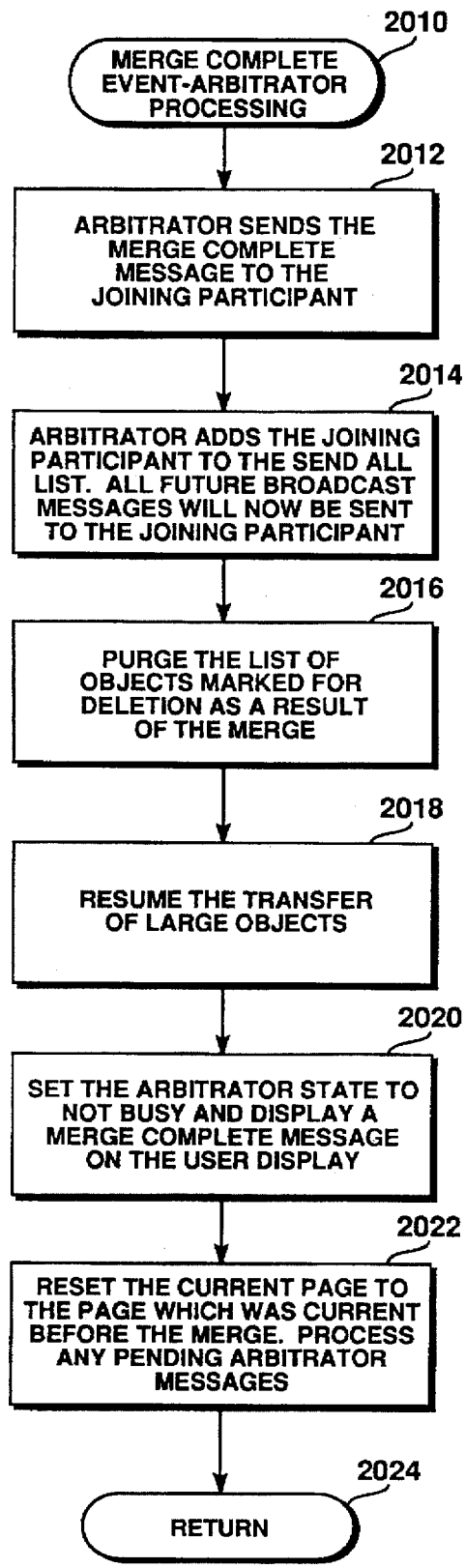
FIG. 20 illustrates the processing logic used in the present invention for handling a merge complete event as processed by the arbitrator.
Figure 21:
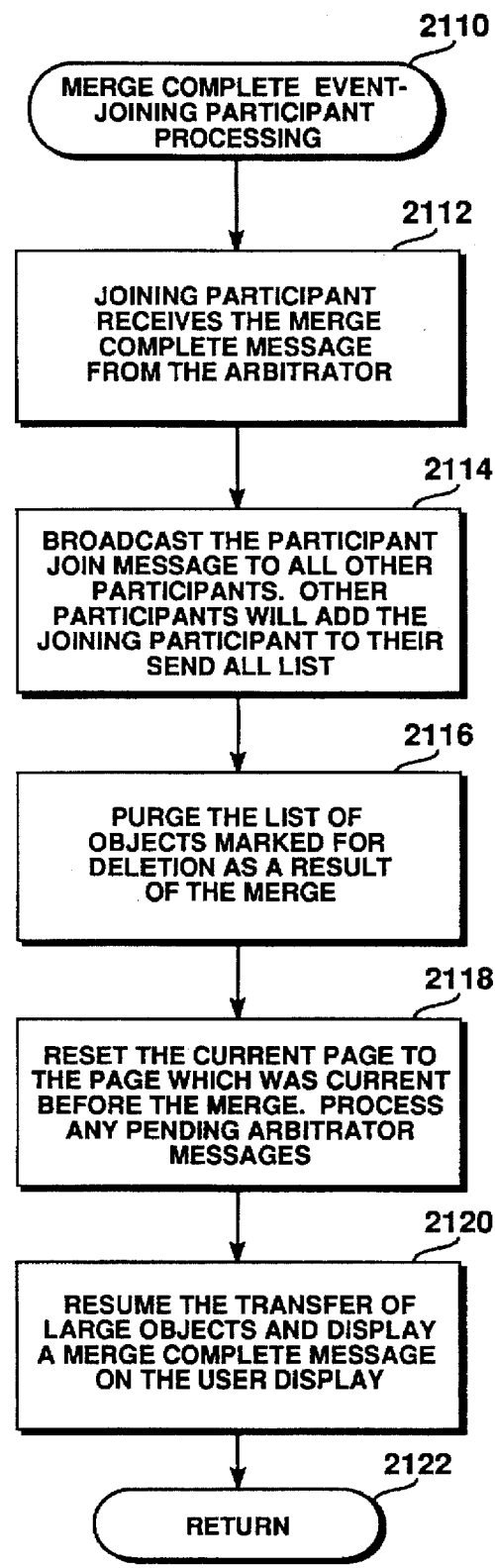
FIG. 21 illustrates the processing used in the present invention for handling a merge complete event as viewed from a joining participant.

Referring now to FIGS. 20 and 21, processing for the Merge Complete event is illustrated. FIG. 20 illustrates the processing performed by the arbitrator participant for a Merge Complete message. FIG. 21 illustrates the processing performed by a joining participant in response to a Merge Complete message. Referring now to FIG. 20, the Merge Complete event processing performed by the arbitrator begins as the arbitrator sends the Merge Complete message to the joining participant (processing block 2012) to enable the joining participant to receive messages broadcast to all conference participants. The arbitrator adds the joining participant to the send all list (processing block 2014). As a result of a merge operation, objects may be been marked for deletion by the arbitrator. For example, blank pages or duplicate pages of a meeting page list may be marked for deletion during the merge process. As a clean-up task, the objects marked for deletion are purged in processing block 2016. Because the merge process is complete, the transfer of large objects or large data blocks across the network is resumed in processing block 2018. The arbitrator state is set to a not-busy state in processing block 2020 to enable the arbitrator to process subsequent requests for a merge operation. In addition, a Merge Complete message is displayed on the user's display screen using the human interface component 212. Finally, the current page pointer is reset to point to the page which was the current page before the merge process began. The arbitrator processes any pending arbitrator messages in processing block 2022 and Merge Complete event processing terminates through return bubble 2024.

Referring now to FIG. 21, the Merge Complete event processing for a joining participant is illustrated. In processing block 2112, the joining participant receives the Merge Complete message sent by the arbitrator. The newly joined participant sends a Participant Join message to all other conference participants. As a result of the Participant Join message, other conference participants will add the newly joined participant to their send all list (processing block 2114). The list of objects previously marked for deletion as a result of the merge process is purged in processing block 2116. The current page pointer is reset to point to the page which was current before the merge process began. Any pending arbitrator messages are processed by the arbitrator in processing block 2118. The transfer of large objects or large data blocks is resumed in processing block 2120. A Merge Complete message is displayed on the user's display screen using human interface 212 and Merge Complete event processing terminates through return bubble 2122.

Referring now to FIG. 22, the processing for a Merge Page List event is illustrated. In processing block 2212, the joining participant sends a page list to the arbitrator to be merged into the current meeting. The joining participant replaces its page list with the arbitrator's page list (processing block 2212). The arbitrator adds the joining participant to the arbitrator's send all list so the joining participant will receive any page modifications (processing block 2212). The arbitrator receives page list to be merged from the joining participant in processing block 2216. The arbitrator initializes a Merge Page List loop which starts at the bubble labeled E illustrated in FIG. 23.

Referring now to FIG. 23, the Merge Page List event processing continues as the arbitrator gets the next page to be merged in processing block 2310. If this is the last page in the page list, processing path 2314 is taken to processing block 2318 where the joining participant's page list structure is deleted. A Merge Complete message is sent by the arbitrator to the joining participant in processing block 2318 and the Merge Page List operation terminates through the return bubble 2319. If the end of the page list has not been reached, processing path 2316 is taken to decision block 2320 where the arbitrator page list is searched for a page with the same page identifier as the page to be merged. If there is no matching page currently in the page list, processing path 2322 is taken to processing block 2328 where a page is added to the arbitrator's page list and the page is broadcast to other conference participants in the send all list. Processing then continues at the top of the Merge Page List loop through the bubble labeled E. If a page to be merged and a page currently in the page list both have the same identifier, processing path 2324 is taken to processing block 2326. The annotation list for the matching pages are merged in processing block 2326. The processing performed in processing block 2326 to merge the annotation list is highlighted in detail in FIGS. 24 and 25 which are described below. If, as a result of merging the annotation lists for the pages with the same page identifier, it is determined that the annotation lists of both pages are equal, processing path 2334 is taken to processing block 2336 where the joining participant's duplicate page is added to the free list. Adding the joining participant's duplicate page to the free list effectively deletes the page from the current page list. Processing continues for the next page at the top of the Merge Page List loop through the bubble labeled E in FIG. 23. If as a result of the merge annotation list processing the annotation list of the pages to be merged are found to be unequal, processing path 2332 is taken to the top of the Merge Page List loop through the bubble labeled E. In this case, both pages are retained in the page list. The Merge Page List loop illustrated in FIG. 23 continues until each page in the page list has been processed.

Figure 24:
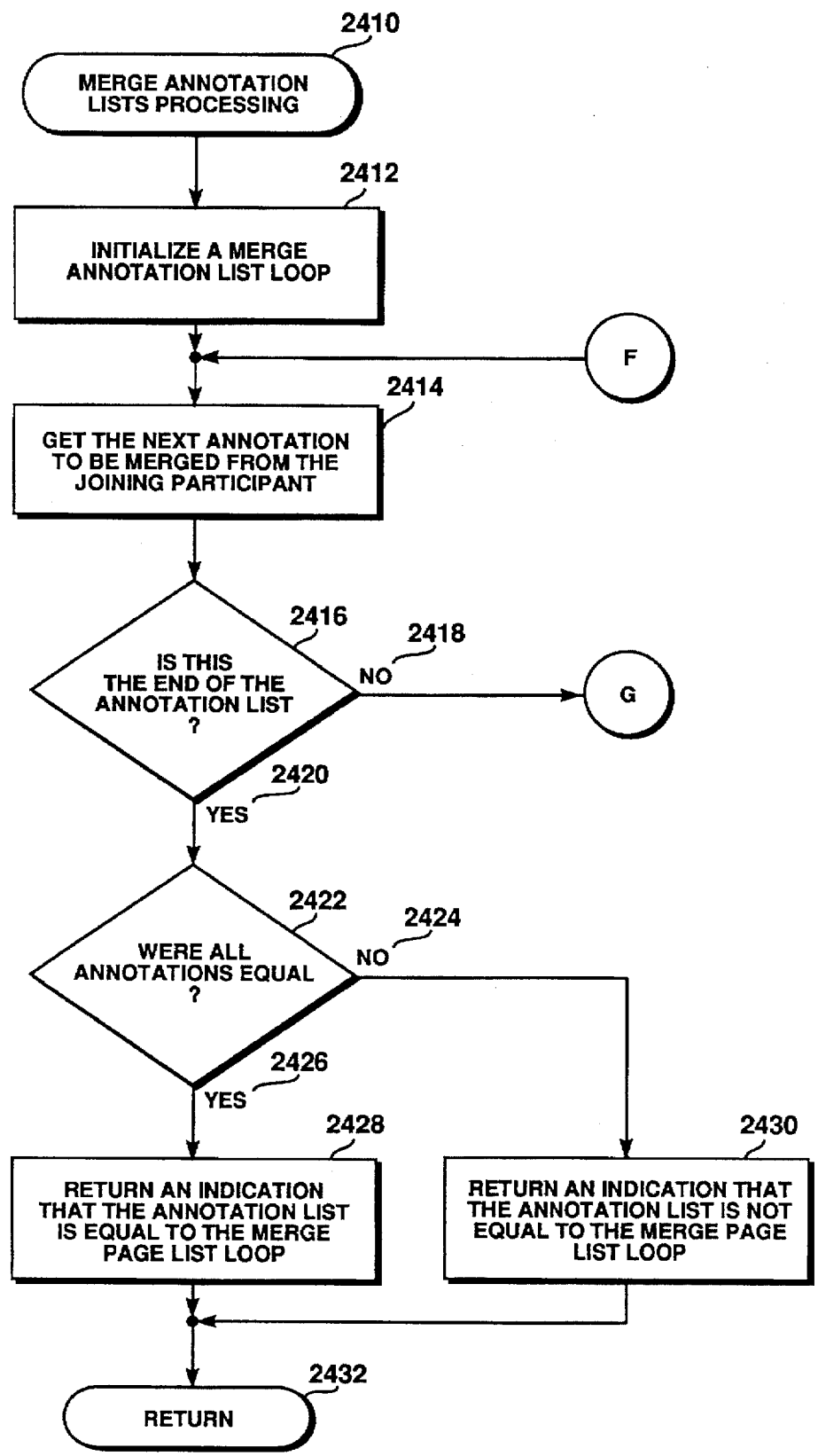
FIGS. 24 and 25 illustrate the processing logic used in the present invention for processing a merge annotation list event.
Figure 25:
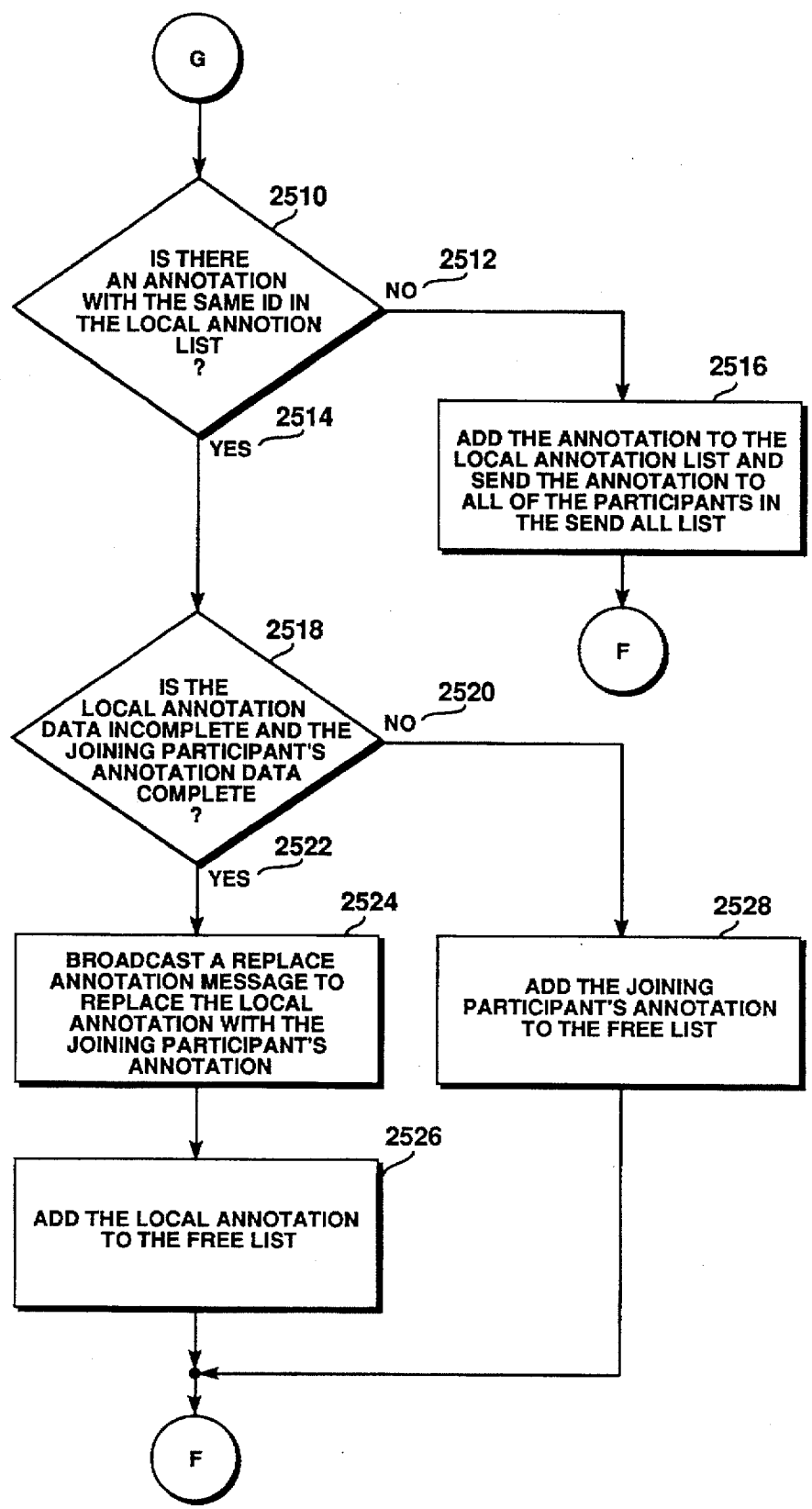

Referring now to FIG. 24, the merge annotation list processing is illustrated. The processing illustrated in FIGS. 24 and 25 is initiated as a result of the execution of processing block 2326 illustrated in FIG. 23. In this case, a page from a joining participant is to be merged with a page from the current page list. In processing block 2412, a merge annotation list loop is initialized. This loop is iterated for each annotation in the annotation list of the page to be merged from the joining participant. In processing block 2414, each annotation in the annotation list of the joining participant's page is obtained. If the end of the annotation list has not been reached (processing path 2418), the annotation is processed through the bubble labeled G illustrated in FIG. 25. If the end of the annotation list has been reached or is null, processing path 2420 is taken to decision block 2422. If each of the annotations from the joining participant page are equal to the annotations of the page from the current page list, processing path 2426 is taken to processing block 2428 where an indication is returned to the Merge Page List loop that identifies the fact that the annotation lists of both pages are equal. Processing then returns to the Merge Page List loop through return bubble 2432. If all annotations of the joining participant page and the current page list page are not equal, processing path 2424 is taken to processing block 2430. In this case, an indication is returned to the Merge Page List loop that signals the fact that the annotations of the joining participant page and the current page list page are not equal. Processing then returns to the Merge Page List loop through the return bubble 2432.

Referring to FIG. 25, the merge annotation list processing continues at the bubble labeled G. In this case, the annotation of the joining participant page has been found to be non-empty. The annotation from the joining participant page is compared with annotations in the annotation list of the local page in decision block 2510. If there is no annotation with the same identifier in the local annotation list, processing path 2512 is taken to processing block 2516. In this case, the annotation from the joining participant page is added to the local annotation list and the newly added annotation is sent to all other conference participants in the send all list. Processing for the next annotation begins at the top of the annotation list loop through the bubble labeled F illustrated in FIG. 24.

If there is an annotation with the same identifier in the local annotation list, processing path 2514 is taken to decision block 2518. In this case, the annotation from the joining participant page is compared with the annotation in the local page list. If the content of the local annotation is incomplete or the joining participant's annotation is more complete, processing path 2522 is taken to processing block 2524. In this case, the joining participant's annotation is substituted for the annotation in the local page. This task is performed by broadcasting a replace annotation message to other conference participants. The other conference participants respond to this message by replacing the local annotation with the joining participant's annotation sent with the replace annotation message (processing block 2524). The local annotation object is then deleted by adding the annotation to the free list in processing block 2526. Processing for the next annotation continues through the bubble labeled F illustrated in FIG. 24. Referring again to decision block 2518, if the local annotation data is complete or the joining participant's annotation data is less complete, processing path 2520 is taken to processing block 2528. In this case, the annotation from the joining participant's page provides no additional information not already in the local page. Thus, the joining participant's annotation object is deleted by adding the object to the free list in processing block 2528. Processing then continues with the next annotation through the bubble labeled F as illustrated in FIG. 24.

Thus, an improved method and apparatus for joining participants in a conferencing system is disclosed. This specific arrangements and methods herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. In a computer conferencing system having a plurality of participants coupled by a communication medium, each participant of said plurality of participants having a meeting manager, said meeting manager comprising:

means for collecting public meeting information generated by any of said plurality of participants, said public meeting information including zero or more pages of annotations;

means for receiving joining meeting information from a joining participant;

means for comparing an annotation in said public meeting information with a second annotation in said joining meeting information from said joining participant and generating a set of differences; and means for selectively sending said set of differences to at least one participant in said plurality of participants.

2. The meeting manager as claimed in claim 1 further including means for collecting private meeting information from a local participant in which said meeting manager is resident, said private meeting information being different from said public meeting information, said private meeting information not accessible to participants of said plurality of conference participants other than said local participant.

3. The meeting manager as claimed in claim 1 wherein a first participant of said plurality of participants is assigned an arbitrator status, said arbitrator status being dynamically modifiable to allow transfer of arbitrator status from a first participant to a second participant, one participant being denoted as the arbitrator participant.

4. The meeting manager as claimed in claim 3 wherein the participant assigned arbitrator status is the only participant in which said means for comparing operates.

5. The meeting manager as claimed in claim 1 further including means for maintaining a participant object list which defines the presence of all participants of said plurality of participants.

6. The meeting manager as claimed in claim 5 further including means for reserving a position in said participant object list while said joining participant is joining.

7. The meeting manager as claimed in claim 1 further including means for notifying all other participants that said joining participant has joined.

8. The meeting manager as claimed in claim 1 wherein said means for selectively sending said set of differences further includes means for sending said set of differences to said plurality of participants only if said joining meeting information includes information not already included in said public meeting information.

9. The meeting manager as claimed in claim 1 wherein said means for selectively sending said set of differences further includes means for sending said set of differences to said joining participant only if said public meeting information includes information not already included in said joining meeting information.

10. The meeting manager as claimed in claim 3 further including means for queuing messages to said arbitrator participant.

11. In a computer conferencing system having a plurality of participants coupled by a communication medium, each participant of said plurality of participants having a meeting manager, a process for joining participants comprising the steps of:

collecting public meeting information generated by any of said plurality of participants, said public meeting information including zero or more pages of annotations;

receiving joining meeting information from a joining participant;

comparing an annotation in said public meeting information with a second annotation in said joining meeting information from said joining participant and generating a set of differences; and selectively sending said set of differences to at least one participant in said plurality of participants.

12. The process as claimed in claim 11 further including the step of collecting private meeting information from a local participant in which said meeting manager is resident, said private meeting information being different from said public meeting information, said private meeting information not accessible to participants of said plurality of conference participants other than said local participant.

13. The process as claimed in claim 11 wherein a first participant of said plurality of participants is assigned an arbitrator status, said arbitrator status being dynamically modifiable to allow transfer of the arbitrator status from the first participant to a second participant, said one participant being denoted as the arbitrator participant.

14. The process as claimed in claim 13 wherein the participant assigned arbitrator status is the only participant that performs said comparing step.

15. The process as claimed in claim 11 further including the step of maintaining a participant object list which defines the presence of all participants of said plurality of participants.

16. The process as claimed in claim 15 further including the step of reserving a position in said participant object list while said joining participant is joining.

17. The process as claimed in claim 11 further including the step of notifying all other participants that said joining participant has joined.

18. The process as claimed in claim 11 wherein said step of selectively sending said set of differences further includes the step of sending said set of differences to said plurality of participants only if said joining meeting information includes information not already included in said public meeting information.

19. The process as claimed in claim 11 wherein said step of selectively sending said set of differences further includes the step of sending said set of differences to said joining participant only if said public meeting information includes information not already included in said joining meeting information.

20. The process as claimed in claim 13 father including the step of queuing messages to said arbitrator participant.

21. The process as claimed in claim 13 further including the step of transferring object data subsequent to the transfer of object structure.

22. A computer conferencing system having a plurality of participants coupled by a communication medium, each participant of said plurality of participants having a meeting manager, said meeting manager comprising:

an arbitrator participant collecting public meeting information generated by any of said plurality of participants, said public meeting information includes zero or more pages of annotations;

a communications medium used to transfer a connection indication and joining meeting information from a joining participant;

logic circuitry used to compare an annotation in said public meeting information with a second annotation in said joining meeting information and generating a set of differences; and processing electronics used to selectively send said set of differences to one of said joining participant, said plurality of participants, and a grouping of all of said joining participant and said plurality of participants.

* * * * *

UNITED STATES PATENT AND TRADEMARK OFFICE
CERTIFICATE OF CORRECTION

PATENT NO. : 5,729,687
DATED : March 17, 1998
INVENTOR(S) : Rothrock et al.

It is certified that error appears in the above-identified patent and that said Letters Patent is hereby corrected as shown below:

In column 4 at line 3 delete "an" and insert --art--

In column 6 at line 41 delete "inflated" and insert --intiated--

In column 10 at line 50 delete "fist" and insert --list--

In column 13 at line 32 delete "cheched" and insert --checked--

Signed and Sealed this

Twentieth Day of October, 1998

*Attest:*

BRUCE LEHMAN

*Attesting Officer*   *Commissioner of Patents and Trademarks*